US009413445B2

(12) United States Patent
Kim

(10) Patent No.: US 9,413,445 B2
(45) Date of Patent: Aug. 9, 2016

(54) SCHEDULING METHOD AND APPARATUS FOR BEAMFORMING IN MOBILE COMMUNICATION SYSTEM

(71) Applicant: Samsung Electronics Co., Ltd., Suwon-si, Gyeonggi-do (KR)

(72) Inventor: Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 14/253,094

(22) Filed: Apr. 15, 2014

(65) Prior Publication Data

US 2014/0307654 A1    Oct. 16, 2014

(30) Foreign Application Priority Data

Apr. 15, 2013    (KR) .......................... 10-2013-0041293

(51) Int. Cl.
H04W 4/00 (2009.01)
H04B 7/06 (2006.01)
H04B 7/04 (2006.01)
H04W 72/12 (2009.01)

(52) U.S. Cl.
CPC ............ *H04B 7/0617* (2013.01); *H04B 7/0413* (2013.01); *H04B 7/0619* (2013.01); *H04B 7/0647* (2013.01); *H04B 7/0684* (2013.01); *H04W 72/1231* (2013.01)

(58) Field of Classification Search
None
See application file for complete search history.

(56) References Cited

U.S. PATENT DOCUMENTS

| 7,406,336 | B2 * | 7/2008 | Astely | H04B 7/0632 342/367 |
|---|---|---|---|---|
| 8,040,856 | B2 * | 10/2011 | Xia | H04B 7/0617 370/335 |
| 2008/0248802 | A1 | 10/2008 | Krishnamoorthy | |
| 2010/0046457 | A1 | 2/2010 | Abraham et al. | |
| 2012/0032848 | A1 | 2/2012 | Nsenga | |
| 2013/0051382 | A1 | 2/2013 | Derham | |
| 2013/0301454 | A1 | 11/2013 | Seol et al. | |

FOREIGN PATENT DOCUMENTS

| EP | 1841092 A1 | 10/2007 |
|---|---|---|
| KR | 10-2013-0127376 A | 11/2013 |
| WO | 2013/015636 A2 | 1/2013 |

* cited by examiner

*Primary Examiner* — Frank Duong
(74) *Attorney, Agent, or Firm* — Jefferson IP Law, LLP

(57) ABSTRACT

A scheduling method for beamforming in a mobile communication system is provided. The scheduling method includes determining whether to transmit an aperiodic second training signal, using first feedback information for a first training signal that is periodically transmitted, the first feedback information being received from at least one Mobile Station (MS), and upon determining to transmit the second training signal, transmitting the second training signal to MSs selected using the first feedback information, and performing scheduling on DownLink (DL) data based on second feedback information for the received second training signal.

28 Claims, 21 Drawing Sheets

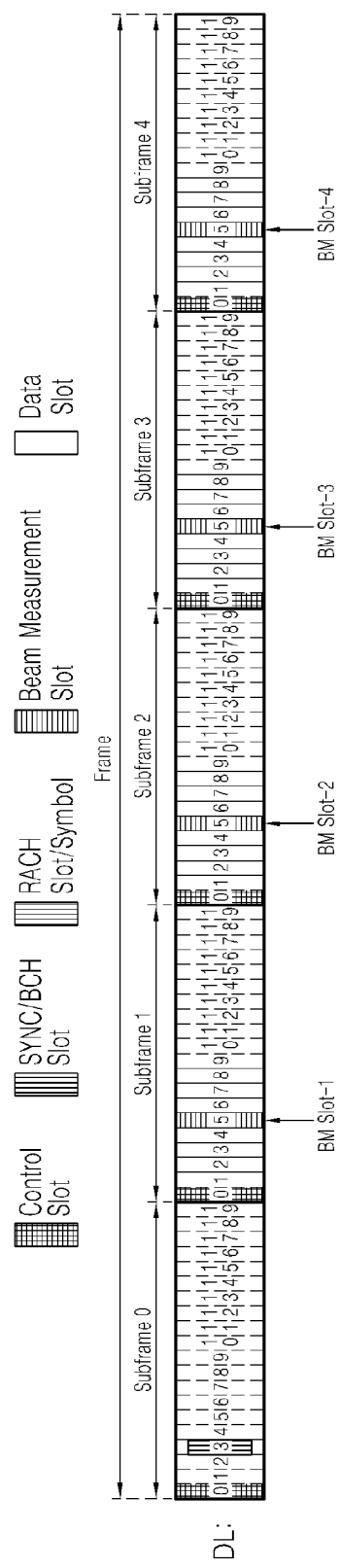
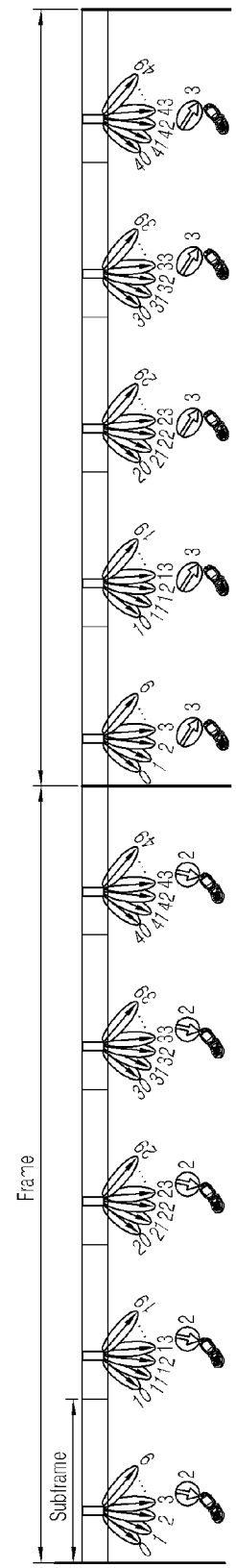
FIG.13A
FIG.13B

SCHEDULING METHOD AND APPARATUS FOR BEAMFORMING IN MOBILE COMMUNICATION SYSTEM

CROSS-REFERENCE TO RELATED APPLICATION(S)

This application claims the benefit under 35 U.S.C. §119(a) of a Korean patent application filed on Apr. 15, 2013 in the Korean Intellectual Property Office and assigned Serial No. 10-2013-0041293, the entire disclosure of which is hereby incorporated by reference.

TECHNICAL FIELD

The present disclosure relates to a scheduling method and apparatus for beamforming in a mobile communication system.

BACKGROUND

With the evolution of mobile communication, methods for increasing the data transfer rate have been studied. Technologies for increasing the data transfer rate may include a method of increasing the bandwidth of a signal, a method of increasing the transmit power, a method of increasing a signal-to-noise ratio at a receiver despite the use of the same transmit power, a method of simultaneously transmitting and receiving a plurality of data using a plurality of antennas, and the like.

As a specific example, the recently commercialized $3^{rd}$ Generation Partnership Project (3GPP) Long-Term Evolution (LTE) communication system may increase the data transfer rate by transmitting and receiving signals in accordance with the Orthogonal Frequency Division Multiplexing (OFDM) scheme using a plurality of antennas. Technologies applied to increase the data transfer rate may include Multi-Input Multi-Output (MIMO) technology in which each of a transmitter and a receiver has a plurality of antennas, and simultaneously transmits modulation symbols via a plurality of antennas at the position of the same OFDM subcarrier, Single-User Multi-Input Multi-Output (SU-MIMO) technology in which a transmitter transmits signals to one receiver using a plurality of transmit antennas, and digital precoding technology in which, when one modulation symbol is transmitted to one receiver using a plurality of transmit antenna, an appropriate weight is multiplied by a modulation symbol transmitted via each transmit antenna. As another technology, there is Multi-User Multi-Input Multi-Output (MU-MIMO) technology in which when a transmitter simultaneously transmits modulation symbols to a plurality of receivers using a plurality of transmit antennas, a receiver receives only the desired symbols by applying a precoder value which is selected to maximize the magnitude of the signal that the receiver desires to receive, and to minimize the magnitude of interference signals.

Generally, in the LTE system having a plurality of antennas, in order for signals to be transmitted and received at any location in the cell, the beam width of each antenna of a transmitter may be set very wide in the horizontal direction. Therefore, the antenna gain used in the LTE system may be limited. In order to address these disadvantages, a scheme (hereinafter referred to as 'analog beamforming technology') has been introduced in which the entire beam width of an antenna is divided into narrow beam widths, and a plurality of beams corresponding thereto are formed. In addition, digital beamforming technology is also used in which when signals are simultaneously transmitted and received via a plurality of beams, the above-described digital precoding is additionally applied.

When the above-described analog beamforming technology is applied, a Base Station (BS) (also known as an evolved Node B (eNB)) and a Mobile Station (MS) (also known as a User Equipment (UE)) of the communication system may use a plurality of beams. In this case, there is a need for a process of selecting the optimal beam combination by performing channel estimation on combinations of beams for each of a plurality of antennas mounted on the BS and beams for each of a plurality of antennas mounted on the MS, for each of a DownLink (DL) and an UpLink (UL). Thus, when the typical analog beamforming is used, the time may be delayed and the resources may be wasted due to the process of selecting the optimal beam combination.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a scheduling method and apparatus for reducing the time and resources required to select an optimal beam combination in a mobile communication system to which analog beamforming is applied.

Another aspect of the present disclosure is to provide a scheduling method and apparatus for determining whether to additionally apply digital precoding to the analog beamforming based on the results of channel estimation that is performed considering the mobility, in order to take the mobility of Mobile Stations (MSs) into consideration.

In accordance with an aspect of the present disclosure, a scheduling method for beamforming in a mobile communication system is provided. The scheduling method includes determining whether to transmit an aperiodic second training signal, using first feedback information for a first training signal that is periodically transmitted, the first feedback information being received from at least one Mobile Station (MS), and, upon determining to transmit the second training signal, transmitting the second training signal to MSs selected using the first feedback information, and performing scheduling on DownLink (DL) data based on second feedback information for the received second training signal.

In accordance with another aspect of the present disclosure, a scheduling method for beamforming in a mobile communication system is provided. The scheduling method includes after transmitting, to a Base Station (BS), first feedback information about channel measurement of a first training signal that is periodically transmitted from the BS, waiting for reception of a second training signal that is aperiodically transmitted via a receive antenna and a receive beam corresponding to first indication information generated based on the first feedback information, and, after transmitting second feedback information about channel measurement of the second training signal to the BS, receiving second indication information including a final path for DL data, which is scheduled based on the second feedback information.

In accordance with further another aspect of the present disclosure, a scheduling method for beamforming in a mobile communication system is provided. The scheduling method includes determining whether to transmit an aperiodic second training signal, based on a channel measurement value for a first training signal that is periodically transmitted from at least one MS, upon determining to transmit the second training signal, transmitting indication information for at least one candidate path selected based on the channel value, to MSs included in the at least one candidate path, and, upon receiving the aperiodic second training signal from the MSs, allocating resources and a final path to be used to transmit UL data based on a channel measurement value for the second training signal.

In accordance with yet another aspect of the present disclosure, a scheduling method for beamforming in a mobile communication system is provided. The scheduling method includes after periodically transmitting a first training signal, receiving, from a BS, first indication information for at least one candidate path selected based on a channel measurement value for the first training signal, transmitting an aperiodic second training signal with the BS's receive antenna and a receive beam via a transmit beam of a transmit antenna corresponding to the first indication information, and after receiving, from the BS, a second indication information for resources and a final path allocated based on a channel measurement value of the second training signal, transmitting UL data via the final path.

In accordance with still another aspect of the present disclosure, a scheduling apparatus for beamforming in a mobile communication system is provided. The scheduling apparatus includes a transceiver configured to receive first feedback information for a first training signal that is periodically transmitted from at least one MS, a controller configured to determine whether to transmit an aperiodic second training signal, using the first feedback information, and, upon determining to transmit the second training signal, to transmit the second training signal to MSs selected using the first feedback information, and to perform scheduling on DL data based on second feedback information for the received second training signal.

In accordance with still another aspect of the present disclosure, a scheduling apparatus for beamforming in a mobile communication system is provided. The scheduling apparatus includes a controller configured to control a transceiver to transmit, to a BS, first feedback information about channel measurement of a first training signal that is periodically transmitted from the BS, and to wait for reception of a second training signal that is aperiodically transmitted via a receive antenna and a receive beam corresponding to first indication information generated based on the first feedback information, and the transceiver configured to, after transmitting second feedback information about channel measurement of the second training signal to the BS, receive, under control of the controller, second indication information including a final path for DL data, which is scheduled based on the second feedback information.

In accordance with still another aspect of the present disclosure, a scheduling apparatus for beamforming in a mobile communication system is provided. The scheduling apparatus includes a controller configured to determine whether to transmit an aperiodic second training signal, based on a channel measurement value for a first training signal that is periodically transmitted from at least one MS, and, upon determining to transmit the second training signal, to control a transceiver to transmit indication information for at least one candidate path selected based on the channel value to MSs included in the at least one candidate path, and upon receiving the aperiodic second training signal from the MSs, to allocate resources and a final path to be used to transmit UL data based on a channel measurement value for the second training signal.

In accordance with still another aspect of the present disclosure, a scheduling apparatus for beamforming in a mobile communication system is provided. The scheduling apparatus includes a transceiver configured to, after periodically transmitting a first training signal, receive, from a BS, first indication information for at least one candidate path selected based on a channel measurement value for the first training signal, and to transmit an aperiodic second training signal with the BS's receive antenna and a receive beam via a transmit beam of a transmit antenna corresponding to the first indication information, and a controller configured to control the transceiver to, after receiving from the BS a second indication information for resources and a final path allocated based on a channel measurement value of the second training signal, transmit UL data via the final path.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 13A illustrates an example of a DL frame structure according to an embodiment of the present disclosure;

FIG. 13B illustrates an example of a method of switching transmit beams of a BS and receive beams of an MS for transmission/reception of a first DL training signal in a DL frame structure according to an embodiment of the present disclosure;

Throughout the drawings, like reference numerals will be understood to refer to like parts, components, and structures.

DETAILED DESCRIPTION

Figure 1:
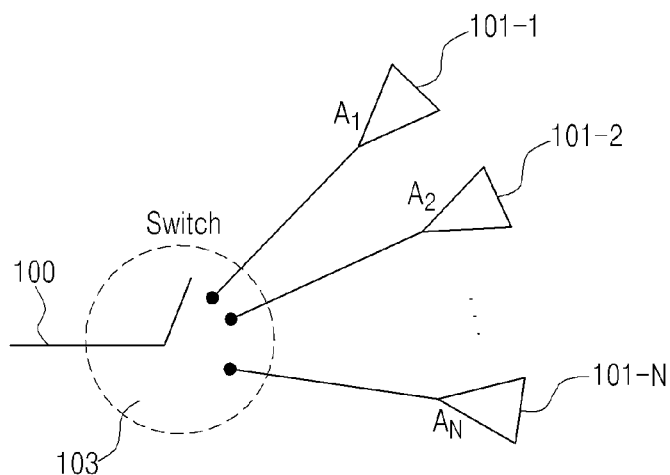
FIG. 1 illustrates a horn antenna that is an example of an antenna to which analog beamforming is applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a type of analog beamforming scheme, there is a scheme of selecting optimal beams through a 2-step training process that uses wide beams and narrow beams. As a specific example thereof, a one-to-one communication environment between Mobile Stations (MSs) in the Wireless Local Area Network (WLAN) standard will be considered. In this case, a transmitting MS may transmit a training signal using each of wide beams. The transmitting MS may repeat its transmission of a training signal for each wide beam until a response signal is received from a receiving MS, because the transmitting MS cannot determine the exact location of the receiving MS. Thereafter, if the receiving MS receives the training signal, the receiving MS may detect a wide transmit beam which is optimal for the receiving MS itself, among the wide transmit beams of the transmitting MS, and transmit information about the detected wide transmit beam to the transmitting MS. In response, the transmitting MS may re-transmit a training signal via narrow beams obtained by dividing the selected wide transmit beam into narrow transmit beams at predetermined intervals. Upon receiving a training signal that is transmitted via the narrow beams, the receiving MS may select an optimal narrow beam among the narrow beams via which the training signal is received, and provide information about the selected optimal narrow beam to the transmitting MS. The 2-step training process that uses the wide transmit beams and the narrow transmit beams has an advantage of reducing the waste of resources used for selecting optimal beams in the one-to-one communication environment.

However, in a mobile communication environment in which a BS has a plurality of MSs to provide a service, if optimal beams are selected by applying the 2-step training process, the waste of resources may increase undesirably. For example, if the Base Station (BS) transmits a 1-step training signal to all MSs located in its cell through its own wide beams, MSs in different locations may select different wide beams as their optimal beams. Eventually, therefore, the BS may additionally transmit narrow beams, which are selected by each of the MSs in different locations, and into which optimal wide beams for each of the MSs are divided. Therefore, in an embodiment of the present disclosure, the BS may repeatedly transmit a training signal at regular intervals using only the narrow beams, without applying the above-described 2-step training signal transmission process, considering the characteristics of the mobile communication environment where a plurality of MSs are located.

When using beamforming in the mobile communication environment, in order to keep using the optimal transmit/receive beams at all times, the BS needs to repeatedly transmit a training signal at fixed intervals, while sequentially switching each of the transmit beams. Then, each of the MSs may sequentially measure a received training signal for all of the transmit beams of the BS, which are sequentially switched for each of its own receive beams, and may find optimal transmit/ receive beams based on the measurement results. As a result, the periodic training signal transmission scheme of sequentially switching the transmit beams of the BS should be performed according to the number of receive beams of the MS. Accordingly, a lot of time may be consumed in the process of measuring a training signal for the transmit/receive beams of the BS and the MSs.

In addition, the process in which an MS measures a training signal for each receive beam may correspond to a process of measuring average receive power for training signals of transmit beams, which are received via the receive beam. As for the measured average receive power, an error may occur due to the influence of changes in the long-term communication channel characteristics that slowly vary based on the macroscopic characteristics of a signal reflector, such as the beam width and direction between a BS and an MS, and the locations and sizes of buildings around the BS and the MS, or in the short-term communication channel characteristics that are instantaneous according to the moving speed of the MS.

Therefore, embodiments of the present disclosure will provide herein a scheduling method and apparatus improved to minimize the number of training signals and feedback signals transmitted/received to determine optimal transmit/receive beams, reduce the scheduling complexity and maximize the communication efficiency in a communication system employing a plurality of analog beams.

The present disclosure will be described based on the mobile communication environment in which each of a BS and MSs has a plurality of antennas, and forms a plurality of transmit/receive beams using the plurality of antennas.

FIG. 1 illustrates a horn antenna that is an example of an antenna to which analog beamforming is applied according to an embodiment of the present disclosure.

Referring to FIG. 1, for example, each of a BS and MSs located in service coverage of the BS may perform analog beamforming using a plurality of horn antennas. The beam width and direction of a horn antenna may be defined by the physical form of the antenna. For example, herein, a BS or MS 100 may have a total of N horn antennas 101-1, 101-1, to 101-N, which are installed in different directions. The BS or MS 100 may select a specific horn antenna using a switch 103 capable of connecting with one of the horn antennas 101-1 to 101-N. The BS or MS 100 may transmit or receive an analog signal with the beam width and in the beam direction of the selected horn antenna. In this case, the beam width and direction of the selected horn antenna may correspond to the beam width and direction of a transmit beam or a receive beam of the BS or MS 100.

Figures 2A, 2B:
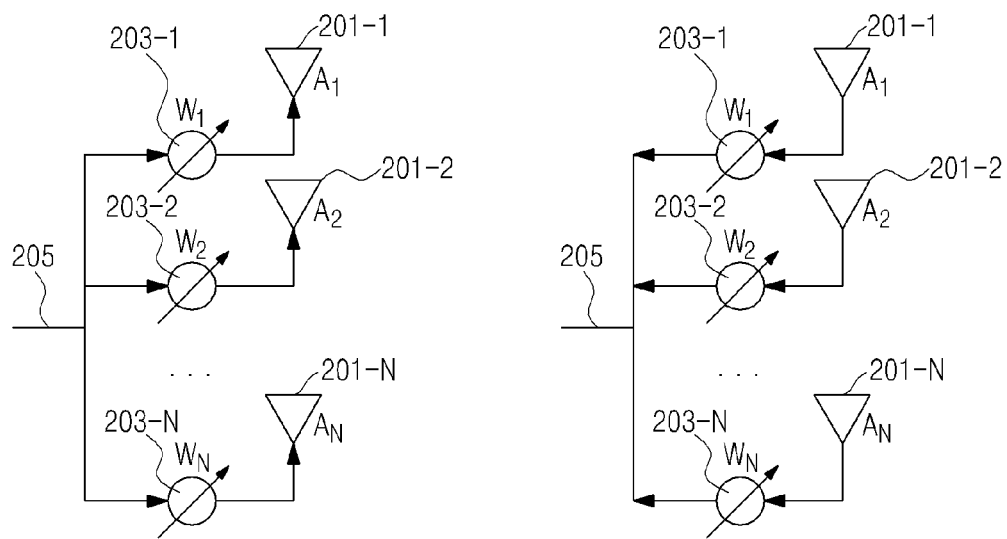
FIGS. 2A and 2B illustrate another example of an antenna to which analog beamforming is applied according to an embodiment of the present disclosure.

FIGS. 2A and 2B illustrate another example of an antenna to which analog beamforming is applied according to an embodiment of the present disclosure.

Referring to FIGS. 2A and 2B, it will be assumed that each of a BS and MSs that perform analog beamforming according to an embodiment of the present disclosure has an array antenna. For reference, FIG. 2A illustrates a case in which a BS or MS 205 sets an array antenna in the transmit direction, and FIG. 2B illustrates a case in which the BS or MS 205 sets an array antenna in the receive direction. In this case, the BS or MS 205 may simultaneously transmit or receive the same signal by using a total of, for example, N antennas 201-1, 201-2 to 201-N as one array. The BS or MS 205 may perform analog beamforming by changing a phase of a signal transmitted/received via each antenna to a value that is set in advance in the associated phase shifter, by means of phase shifters 203-1, 203-2, to 203-N, which are connected to the antennas 201-1 to 201-N, respectively. As for the signals which are finally transmitted/received via the antennas 201-1 to 201-N, their beam widths and beam directions are determined based on the total number N of antennas and the value that is set in advance in the phase shifter connected to each antenna. Similarly, even in this case, the beam width and beam direction determined based on the value that is set in advance in a phase shifter for each antenna may correspond to the beam width and direction of a transmit beam of the BS or MS 205 in the case of FIG. 2A, and correspond to the beam width and direction of a receive beam of the BS or MS 205 in the case of FIG. 2B.

By adjusting the value that is set in advance in a phase shifter connected to an antenna to change the beam shape of the antenna, the magnitude of a signal transmitted/received via each of the antennas 201-1 to 201-N may be changed.

Figure 3:
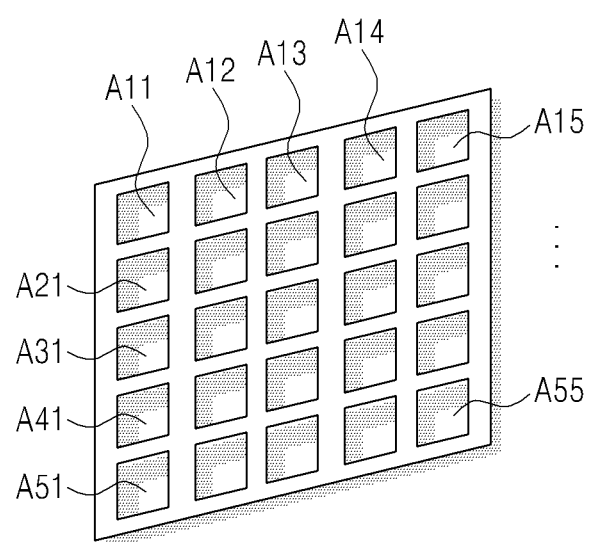
FIG. 3 illustrates an embodiment of an array antenna, such as the antenna array in FIGS. 2A and 2B, according to an embodiment of the present disclosure.

FIG. 3 illustrates an embodiment of an array antenna, such as the antenna array in FIGS. 2A and 2B, according to an embodiment of the present disclosure.

Referring to FIG. 3, five antenna elements may be arranged in each of the horizontal axis and the vertical axis, forming an array antenna on which a total of 25 antenna elements are arranged.

A description will now be made of various embodiments of a scheduling method and apparatus for determining optimal transmit/receive beamforming for data transmission/reception, based on the mobile communication system in which each of a BS and MSs located in the BS's service coverage has antennas, to which the above-described analog beamforming is applied, and forms transmit/receive beams using the antennas.

First Embodiment

In a first embodiment of the present disclosure, training signal transmission by a BS and feedback by an MS may be performed in 2 steps in a DownLink (DL). The BS may perform 2-step scheduling corresponding to 2-step feedback.

For example, a training signal transmission process by a BS according to the first embodiment may include a first step of periodically transmitting a first DL training signal, and a second step of aperiodically transmitting a second DL training signal for digital precoding via candidate paths selected by first DL scheduling that is performed based on the transmission results of the first DL training signal. The second step may be optionally performed to cope with changes in channel due to the movement of an MS. The first DL training signal may be transmitted by the BS via each transmit beam for each of all antennas of the BS at a predetermined transmission cycle. The first DL training signal may be repeatedly transmitted as many times as the number of receive beams for each of all antennas mounted on an MS, for each of all MSs located in the cell. Through the first DL training signal transmission process, a DL channel value may be measured for each of all transmit/receive beam combinations each including one transmit beam and one receive beam among the transmit beams for all antennas of the BS and the receive beams for all antennas of the MS. As the first DL training signal is periodically transmitted, a channel value may be measured for each of all the beam combinations regardless of the movement of the MS. Based thereon, the optimal BS antenna and transmit beam may be selected for each receive beam of each of the antennas mounted on each MS.

The second DL training signal may be transmitted just before the actual data transmission by the BS, thereby minimizing the influence of changes in channel due to the movement of the MS. In addition, the BS may perform first DL scheduling of determining whether to perform the second step of aperiodically transmitting the second DL training signal, and of determining at least one candidate path, based on first feedback information that is generated depending on the results of the first DL channel measurement for the first DL training signal. The at least one candidate path may include a candidate MS, and a candidate antenna and a candidate receive beam, which are selected for the candidate MS. The first embodiment of the present disclosure may transmit the second DL training signal only via the least one candidate path in a limited way, so the first embodiment may minimize the waste of time and resources, compared with a case of transmitting the second DL training signal via all transmit/receive beams. The selected candidate MS may perform second DL channel measurement of measuring a channel for the second DL training signal received via the candidate antenna and the candidate receive beam, and may generate second feedback information based on the measurement results and transmit the second feedback information to the BS.

In the first embodiment of the present disclosure, the DL scheduling process may be performed in 2 steps or 3 steps depending on whether the second training signal is transmitted. In other words, if it is determined to perform transmission of the second training signal, the DL scheduling process may include a first step which is the first DL channel measurement that the MS performs based on the first DL training signal, a second step which is the first DL scheduling that the BS performs based on the first feedback information from the MS, and a third step which is the second DL scheduling that the BS performs based on the second feedback information of the second DL training signal that the BS has received through candidate MSs.

The first DL channel measurement of the first step may include a process in which an MS determines at least one candidate combination satisfying predetermined conditions, using receive power or wideband Channel Quality Information (CQI) of the first DL training signal for each of all transmit/receive beam combinations. The MS may include a process of calculating set values for application of an SU-MIMO transmission mode for the at least one candidate combination. The set values and the determination process will be described in more detail with reference to FIG. 4A and FIG. 12.

In the first DL scheduling of the second step, the BS may determine set values for application of an MU-MIMO transmission mode for all MSs, using the first feedback information that is generated based on the results of the first DL scheduling for the MS. The BS may determine whether to perform transmission of a second DL training signal, and determine a candidate path which is a transmission target of the second DL training signal. A process thereof will be described with reference to FIG. 4A. If it is determined not to perform transmission of the second training signal, the DL scheduling according to the first embodiment may be configured in 2 steps that include only the first DL channel measurement and the first DL scheduling.

Finally, in the second DL scheduling of the third step, the BS may select the final path via which the BS will actually transmit data, among the candidate paths, using the second feedback information of the second DL training signal that the BS has received from candidate MSs included in the candidate path, and may actually perform resource allocation for DL data transmission.

Figure 4A:
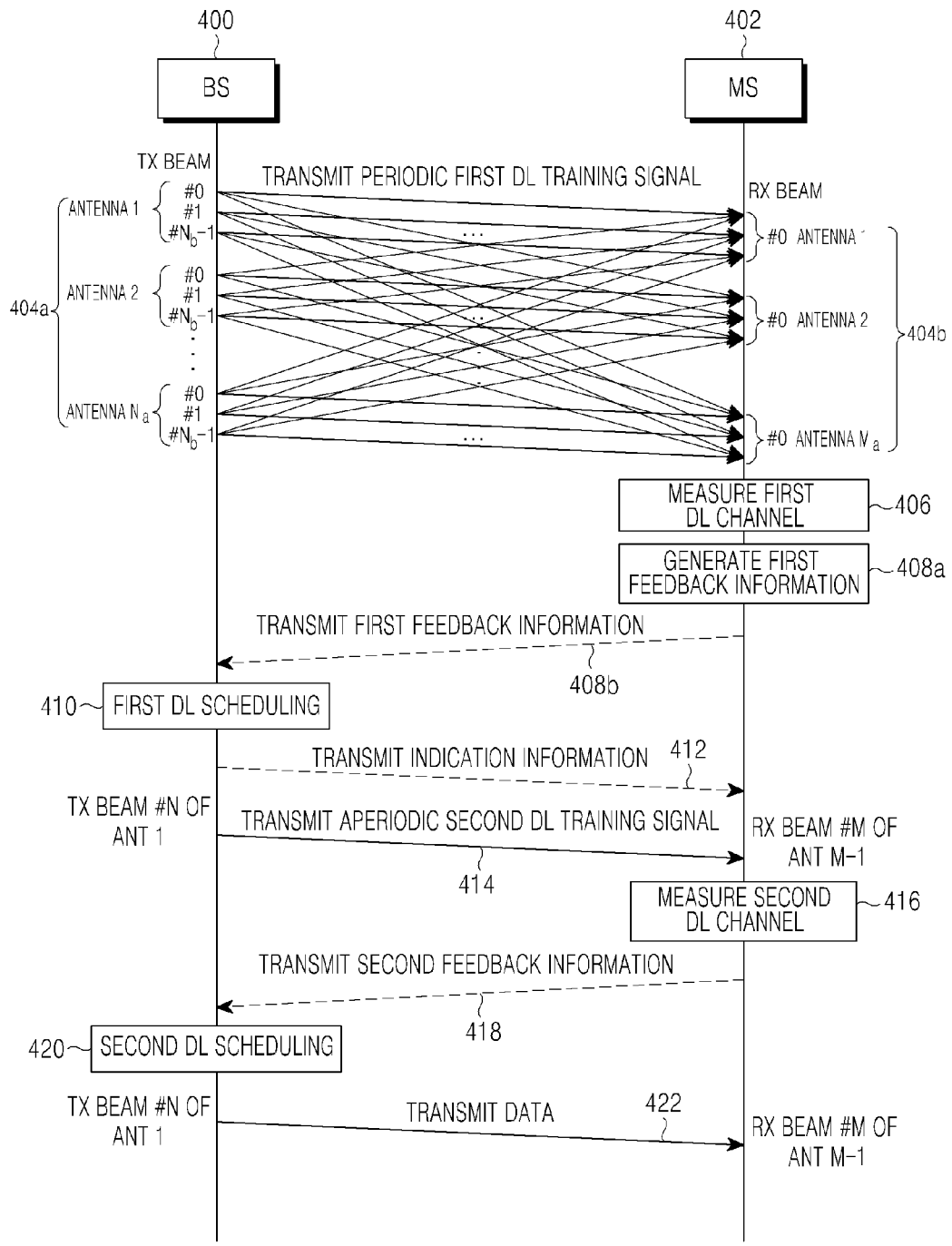
FIG. 4A is a signaling diagram illustrating an example of a scheduling operation of determining optimal transmit/receive beams in a DownLink (DL) according to a first embodiment of the present disclosure.

FIG. 4A is a signaling diagram illustrating an example of a scheduling operation of determining optimal transmit/receive beams in a DL according to a first embodiment of the present disclosure.

Referring to FIG. 4A, it will be assumed herein that a BS 400 and an MS 402 have a total of Na antennas and a total of Ma antennas, respectively. For convenience of description, an operation of only the MS 402 is illustrated, which is one of a plurality of MSs located in the service coverage of the BS 400. However, the other MSs may also operate in the same way as in FIG. 4A.

As an example, it will be assumed that the BS 400 forms a total of Nb transmit beams for each antenna using the above-described horn antennas or array antennas. Similarly, it will be assumed that the MS 402 also forms a total of Mb receive beams for each antenna using the horn antennas or array antennas.

Referring to FIG. 4A, in operation 404a, the BS 400 may generate Nb transmit beams for each of Na antennas, and simultaneously transmit a first DL training signal via Nb transmit beams for each antenna. The BS 400 may generate a total of Nb analog transmit beams for each antenna, but may transmit only one transmit beam at a particular moment. Therefore, the BS 400 may repeatedly transmit the first DL training signal while sequentially switching a total of Nb transmit beams for each of a total of Na antennas for a preset transmission period. It will be assumed that information about the preset transmission period has been broadcasted to all MSs in the cell over a Broadcast Channel (BCH) or a System Information Block (SIB). In operation 404b, the MS 402 may receive the first DL training signal via fixed receive beams for each of Ma antennas for the preset transmission period. As a specific example, in the case of an antenna 1, the MS 402 may receive the first DL training signal that is transmitted via Nb transmit beams for each antenna of the BS 400, via a receive beam #0. Similarly, in the case of an antenna 2, the MS 402 may receive the first DL training signal via the receive beam #0, and in the case of an antenna Ma, the MS 402 may receive the first DL training signal via the receive beam #0. For convenience of description, as for operations 404a to 404b, operations of the BS 400 and the MS 402, which correspond only to one transmission period, are illustrated. Similarly, even in the next DL training signal transmission period, the BS 400 may repeatedly transmit the first DL training signal while sequentially switching Nb transmit beams for each antenna. The MS 402 may also fix the next receive beam (e.g., receive beam #1) for each antenna, and receive the first DL training signal via the fixed receive beam in the next DL training signal transmission period. Although not illustrated in the drawing, the periodic first DL training signal transmission process in operations 404a and 404b will be repeated as many times as the total number Mb of receive beams for each of the antennas of the MS 402.

Thereafter, if the reception of the first DL training signal is completed for each of all transmit/receive beam combinations of the BS 400 and the MS 402, the MS 402 may perform first DL channel measurement based on the received first DL training signal, for each of all the transmit/receive beam combinations in operation 406. In operation 408a, the MS 402 may generate first feedback information by determining at least one candidate combination in which, for example, receive power or wideband CQI of the first DL training signals of all the combinations exceeds a preset threshold or has the maximum value, through the first DL channel measurement. Accordingly, the first feedback information may include, for example, configuration information of the at least one candidate combination, and its associated CQI value or receive power information. The configuration information represents indication information for the BS's antenna and transmit beam and the MS's antenna and receive beam, which are included in the combination. The CQI values may be included in the first feedback information in the form that their complexity is reduced according to an embodiment of the present disclosure. A scheme of reducing the complexity of the CQI values will be described with reference to FIG. 12. The set values for the SU-MIMO mode may be determined based on the determined results. For example, the MS 402 may determine the maximum value of the data transfer rate that can be obtained when the SU-MIMO mode is applied. An example of calculating the maximum value of the data transfer rate will be described with reference to FIG. 12. When additionally using digital precoding, the MS 402 may determine the maximum value of the obtainable data transfer rate in the SU-MIMO mode, and compare the determined maximum value with the maximum value of the data transfer rate obtainable during application of the SU-MIMO mode. The MS 402 may determine whether to apply digital precoding, depending on the comparison results. Accordingly, the MS 402 may include or insert the set values for the SU-MIMO mode in the first feedback information. For example, the set values for the SU-MIMO mode may include the data transfer rate obtainable during application of the SU-MIMO mode, or transfer rate-related information, and an SU-MIMO rank value, for each MS. If it is determined to apply digital precoding depending on the comparison results, a precoder value of the BS 400 for the SU-MIMO mode may also be included in the first feedback information. In operation 408b, the MS 402 may transmit the first feedback information to the BS 400.

In operation 410, the BS 400 may perform first DL scheduling based on the first feedback information that the BS 400 has received from at least one MS including the MS 402. In the first DL scheduling process, the BS 400 may estimate an expected data transfer rate obtainable during application of the MU-MIMO mode to all MSs located in its service coverage, and an MU-MIMO scheduling metric value. In addition, the BS 400 may determine an SU-MIMO scheduling metric using the data transfer rate value in the SU-MIMO mode for each MS, which is obtained from the first feedback information. In addition, the BS 400 may compare the determined scheduling metric values, and select one or both of the SU-MIMO mode and the MU-MIMO mode as a candidate DL transmission mode that is to be used during transmission of data. A determination and comparison process for the scheduling metrics will be described with reference to FIG. 12. In addition, the BS 400 may determine whether to transmit a second DL training signal that the BS 400 transmits aperiodically. If the performance expected during application of the candidate DL transmission mode selected for at least one candidate combination and obtained from the first feedback information exceeds a predetermined performance reference, the BS 400 may determine not to perform the second DL training signal transmission process. An operation following the determining not to perform the second DL training signal transmission process will be described below with reference to FIG. 4B.

In an embodiment of FIG. 4A, it will be assumed that if there is no candidate combination, the expected performance of which exceeds the predetermined performance reference, among the at least one candidate combination, the BS 400 has determined to perform transmission of a second DL training signal. For convenience of description, it will be assumed that the MS 402 is included in the path of the second DL training signal. Thereafter, in operation 412, the BS 400 may deliver indication information indicating paths of the second DL training signal to at least one MS including the MS 402 over a DL control channel (e.g., Physical Downlink Control Channel (PDCCH)). The indication information may be resource allocation information that an MS (e.g., the MS 402) included in the path of the second DL training signal requires in receiving the second DL training signal. The indication information may include configuration information (e.g., indication information for a transmit beam #n of an antenna 1 of the BS 400, and a receive beam #m of an antenna m−1 of the MS 402) for the path of the second DL training signal. In operation 414, the BS 400 may transmit the second DL training signal to the MS 402 in response to the configuration information of the MS 402, which is included in the indication information. In other words, the BS 400 may transmit the second DL training signal via the transmit beam #n of its antenna 1, and the MS 402 may receive the second DL training signal via the receive beam #m of its antenna m−1. The second DL training signal may be aperiodically transmitted just before the DL data transmission to the MS 402, in order to minimize the influence of changes in channel due to the movement of the MS 402.

In operation 416, the MS 402 may perform second DL channel measurement on the path (e.g., between the transmit beam #n of the candidate antenna 1 of the BS 400 and the receive beam #m of the candidate antenna m−1 of the candidate MS 402) using the second DL training signal. In operation 418, the MS 402 may generate second feedback information based on the results of the second DL channel measurement, and transmit the second feedback information to the BS 400. The second feedback information may include the size and phase of the measured channel, a precoder value or a Precoding Matrix Indicator (PMI), a Rank Indicator (RI), CQI, and the like.

Thereafter, in operation 420, the BS 400 may perform second DL scheduling using the second feedback information. Although it is assumed that the second feedback information is received only via the MS 402 for convenience of description, actually, however, the second feedback information has been received even via the MSs included in the path of the second DL training signal, which is determined in the first DL scheduling process of operation 410. Therefore, in the second DL scheduling process, the BS 400 may select at least one final path via which the BS 400 will transmit DL data, among the MSs that have transmitted the second feedback information, and allocate DL resources for DL data transmission. For example, the DL resources may include a DL transmission mode and a precoder value, which will be applied to each MS included in the at least one final path. As an example, it will be assumed that the final path is determined as the transmit beam #n of the antenna 1 of the BS 400 and the receive beam #m of the antenna m−1 of the MS 402. In operation 422, the BS 400 may transmit DL data via the final path.

Figure 4B:
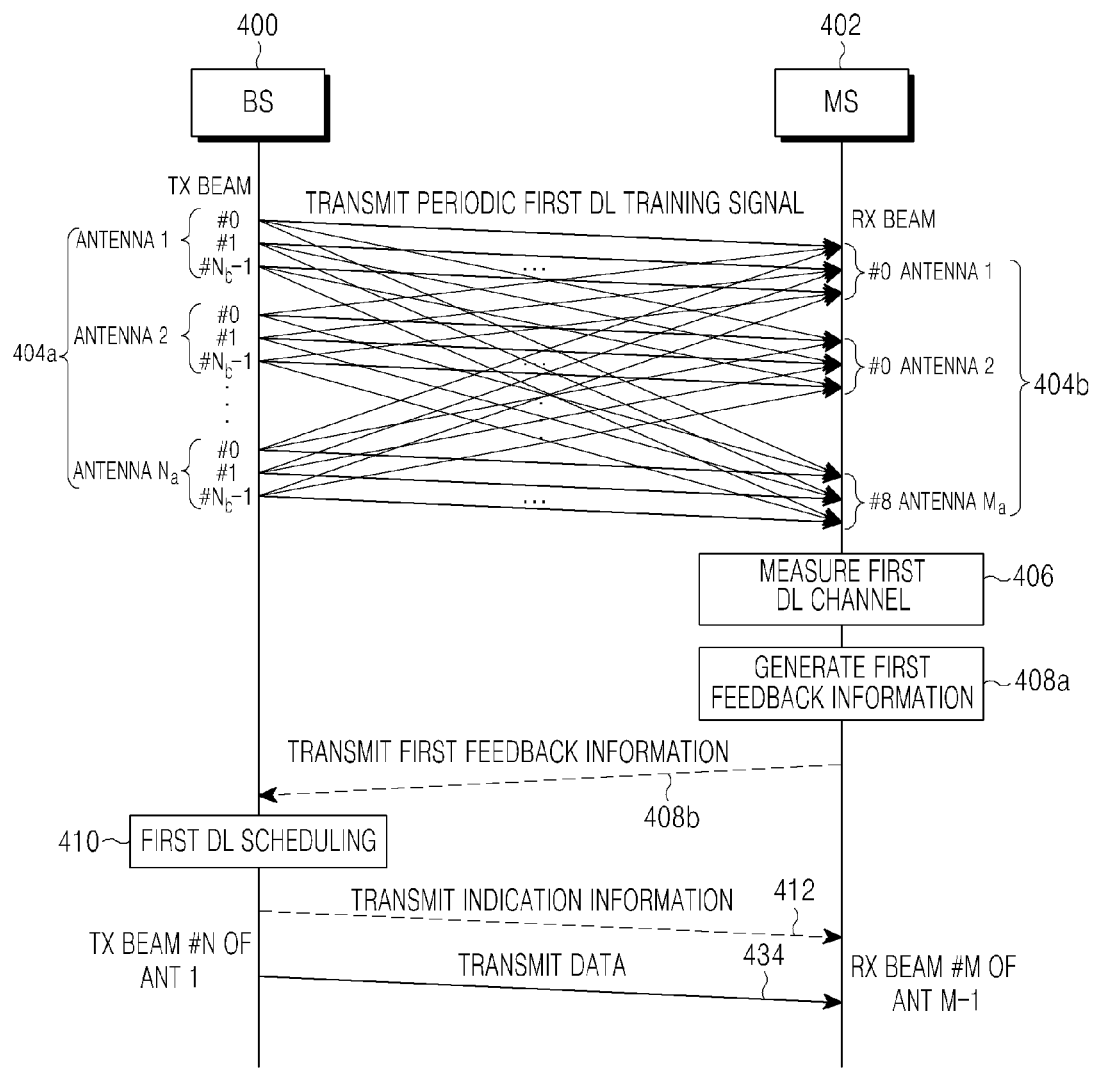
FIG. 4B is a signaling diagram illustrating another example of a scheduling operation of determining optimal transmit/receive beams in a DL according to a first embodiment of the present disclosure.

FIG. 4B is a signaling diagram illustrating another example of a scheduling operation of determining optimal transmit/receive beams in a DL according to a first embodiment of the present disclosure. The signaling diagram in FIG. 4B may correspond to a signaling diagram illustrating a scheduling operation in which, in operation 410 in the embodiment of FIG. 4A, the BS 400 has determined not to perform transmission of the second DL training signal in the first DL scheduling process.

Referring to FIG. 4B, operations of the BS 400 and the MS 402 in operations 404a to 412 are the same as those in operations 404a to 412 in FIG. 4A, so a description thereof will be omitted.

It will be assumed that if it is determined through the first DL scheduling in operation 410 that there is a candidate combination (hereinafter referred to as a 'path of a second DL training signal'), the expected performance of which exceeds the predetermined performance reference, among the at least one candidate combination, the BS 400 has determined not to perform transmission of the second DL training signal.

In this case, in operation 434, the BS 400 may apply a candidate DL transmission scheme for each path, and transmit DL data via the path corresponding to the at least one candidate combination included in the indication information obtained in operation 412. The indication information may be the same as that described in operation 412 of FIG. 4A.

Second Embodiment

In a second embodiment of the present disclosure, a training signal transmission process by an MS and a scheduling process by a BS may be performed in 2 steps in an UpLink (UL).

For example, the training signal transmission process by an MS according to the second embodiment may include a first step of periodically transmitting a first UL training signal, and a second step of aperiodically transmitting a second UL training signal. The MS may transmit a periodic first UL training signal according to the indication information from a BS, or the conditions that are defined in advance in the standard. In addition, the MS may transmit an aperiodic second UL training signal according to the additional indication information from the BS. The first UL training signal and the second UL training signal may be almost the same as the first DL training signal and the second DL training signal in terms of the design method and the transmission principle. The BS may estimate a channel value of the received periodic first UL training signal for all transmit/receive beam combinations. Like in the first embodiment, additional transmission of the second UL training signal is to cope with changes in channel due to the movement of an MS, and like in the DL, the second UL training signal transmission process may be optionally performed.

If the above-described 2-step training signal transmission process is performed in the UL, the UL scheduling process by the BS may also be performed in 2 steps corresponding to the 2-step training signal transmission process. In other words, for each of MSs that have transmitted the first UL training signal, the BS may perform a first UL scheduling process on each channel to the MS, which corresponds to all transmit/receive beam combinations. In other words, through the first UL scheduling process, whether to transmit the aperiodic second UL training signal and the path of the second UL training signal may be determined. Thereafter, if it is determined to transmit the second UL training signal, a second UL scheduling process may be performed based on the second UL training signals received via at least one path for the second UL training signal. The second UL scheduling may also be performed to optimize the scheduling in response to changes in channel and changes in wireless resource allocation conditions due to the movement of the MS, and may be optionally performed if necessary.

Figure 5A:
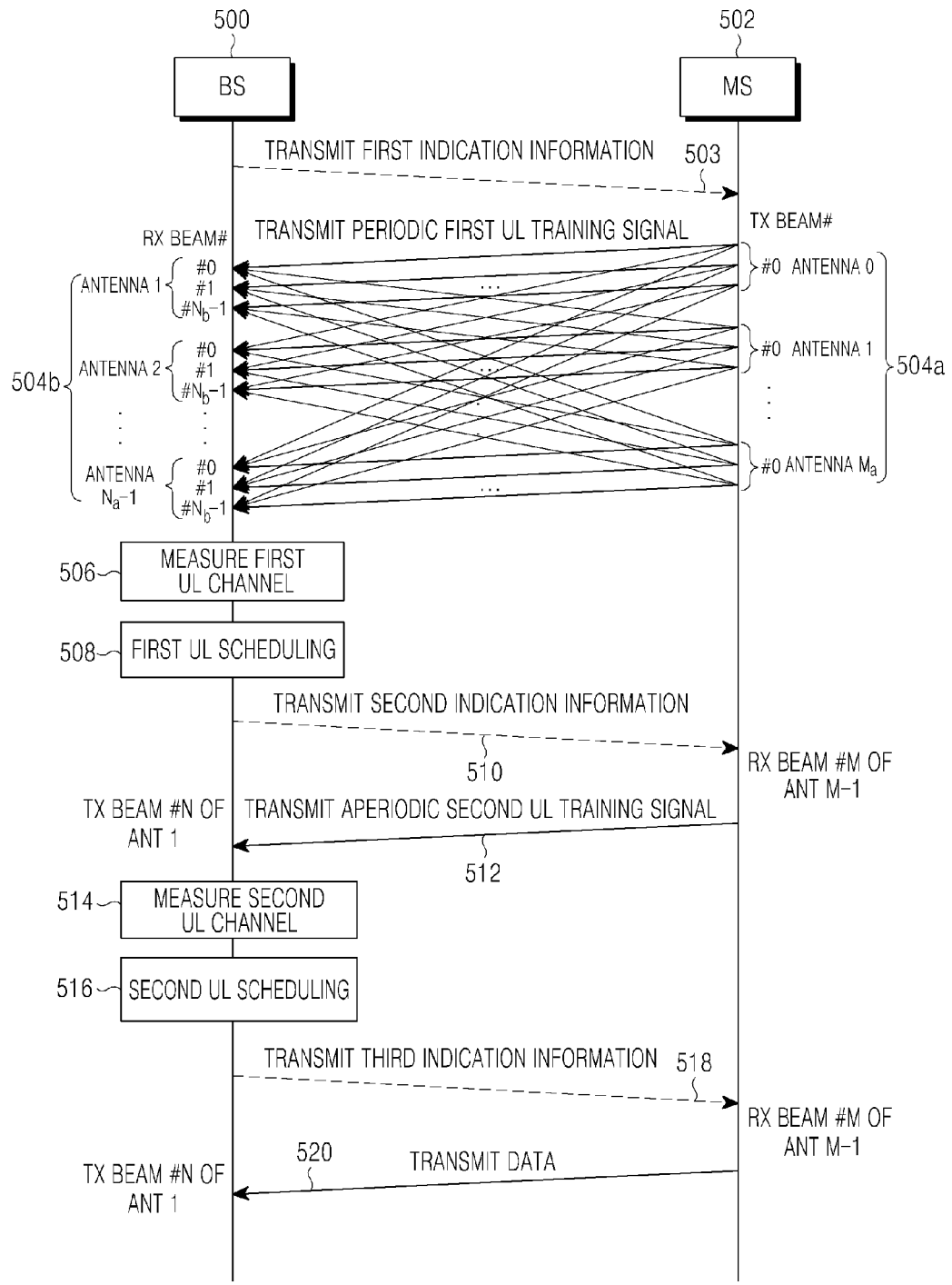
FIG. 5A is a signaling diagram illustrating an example of a scheduling operation of determining optimal transmit/receive beams in a UpLink (UL) according to a second embodiment of the present disclosure.

FIG. 5A is a signaling diagram illustrating an example of a scheduling operation of determining optimal transmit/receive beams in a UL according to a second embodiment of the present disclosure. It will be assumed herein that a BS 500 and an MS 502 have a total of Na antennas and a total of Ma antennas, respectively. For convenience of description, an operation of only the MS 502 is illustrated, which is one of a plurality of MSs located in the service coverage of the BS 500. However, the other MSs may also operate in the same way as in FIG. 5A.

As an example, it will be assumed that the BS 500 forms a total of Nb receive beams for each antenna using the above-described horn antennas or array antennas. Similarly, it will be assumed that the MS 502 also forms a total of Mb transmit beams for each antenna using the horn antennas or array antennas.

In the method of selecting MSs that will transmit the first UL training signal in FIG. 5A, the BS 500 may perform sequential selection on all MSs located in its cell coverage, or an MS may request its transmission of a first UL training signal from the BS 500 depending on the results of the above-described first DL channel measurement that has been performed based on the first DL training signal. Alternatively, the BS 500 may select MSs based on the first feedback information for the first DL training signal that the BS 500 has received from the MSs according to the first embodiment.

In the process of selecting an antenna of each of MSs that will transmit a first UL training signal and of selecting a transmit beam of the antenna, the BS 500 may sequentially select all antenna and transmit beams for each MS, or the MS may designate an antenna and a transmit beam via which the MS will transmit the first UL training signal and request its transmission of the first UL training signal from the BS 500 depending on the results of the first DL channel measurement that has been performed based on the first DL training signal. Alternatively, the BS 500 may designate the antenna and the transmit beam based on the first feedback information that the BS 500 has received from the MSs. It will be assumed herein in FIG. 5A that the MS 502 that transmits a first UL training signal to the BS 500 is one of the MSs selected in the above described way.

Referring to FIG. 5A, in operation 503, the BS 500 may transmit first indication information for a first UL training signal to the MS 502. The first indication information may include, for example, a transmission cycle of the first UL training signal, and an indicator of a transmit beam that will transmit the first UL training signal at the transmission cycle of the first UL training signal, for each antenna of the MS 502.

In operation 504a, the MS 502 may transmit the first UL training signal at the transmission cycle of the first UL training signal using a transmit beam corresponding to the indicator of the transmit beam designated for each of Ma antennas, the indicator being obtained from the first indication information. For example, the first indication information may include an indicator of a transmit beam for each antenna of the MS, the transmit beam being designated to first transmit the first UL training signal for each antenna at the transmission cycle of the first UL training signal. As an example, it will be assumed that a transmit beam of each of an antenna 1 to an antenna Ma is set as a transmit beam #0 at a predetermined transmission cycle. Then, the MS 502 may simultaneously transmit the first UL training signal via each of a total of Ma transmit antennas, and since each antenna can generate one transmit beam at a time, the MS 502 may transmit the first UL training signal at the transmission cycle via a transmit beam #1 corresponding to a transmit beam indicator indicated by the first indication information. If the next transmission cycle of the next first UL training signal comes, the MS 502 may repeat transmission of the first UL training signal until the MS 502 transmits the first UL training signal via all transmit beams of the antenna by sequentially switching to the next transmit beam of the transmit beam indicator indicated by the first indication information, for each antenna. During the first UL training signal transmission period, a fixed transmit beam for each antenna of the MS 502 may repeatedly transmit the first UL training signal as many times as the number of receive beams of each of all antennas of the BS 500. As another example, a transmit beam for each antenna of the MS 502 that will transmit the first UL training signal in the transmission cycle of the next first UL training signal may be set based on the additional indication information from the BS 500.

In operation 504b, the BS 500 may receive the first UL training signal that is repeatedly transmitted during the transmission period of the first UL training signal, via all of a total of Na antennas. In other words, the BS 500 may receive the first UL training signal by sequentially switching a receive beam for each antenna during a transmission period. Therefore, the BS 500 may receive the first UL training signal via receive beams of each of all antennas during the transmission period of the first UL training signal. Thereafter, if the reception of the first UL training signal from all transmit/receive beam combinations is completed, the BS 500 may perform first UL channel measurement based on the received first UL training signal, for each of all the transmit/receive beam combinations in operation 506. In operation 508, the BS 500 may perform first UL scheduling based on the results of the first UL channel measurement. In the first UL scheduling process, the BS 500 may determine at least one candidate combination in which, for example, the receive power or wideband CQI of the first UL training signals of all the transmit/receive beam combinations exceeds a preset threshold or has the maximum value, and may determine configuration information of the at least one candidate combination. The configuration information represents indication information for the BS's antenna and receive beam and the MS's antenna and transmit beam, which are included in the combination. The BS 500 may determine scheduling metrics for the SU-MIMO mode and the MU-MIMO mode based on the determined results. The BS 500 may select one or both of the SU-MIMO mode and the MU-MIMO mode as a candidate UL transmission mode by comparing the determined scheduling metric values. A specific example of the process of selecting the scheduling metric and the candidate UL transmission mode will be described with reference to FIG. 12. In addition, the BS 500 may determine whether to transmit a second UL training signal that the BS 500 transmits aperiodically. If the performance expected during application of the candidate UL transmission mode selected for at least one candidate combination selected in the first UL training signal transmission process exceeds a predetermined performance reference, the BS 500 may determine not to perform the second UL training signal transmission process. An operation following the determining not to perform the second UL training signal transmission process will be described below with reference to FIG. 5B.

If there is no candidate combination, the expected performance of which exceeds the predetermined performance reference, among the at least one candidate combination, the BS 500 may determine to perform transmission of a second UL training signal. As an example, it will be assumed that as a result of the first UL scheduling, there is a candidate combination (hereinafter referred to as a 'path of a second UL training signal'), the expected performance of which exceeds the predetermined performance reference, among the at least one candidate combination. In this case, the BS 500 may determine not to perform transmission of the second UL training signal. For convenience of description, it will be assumed that the MS 502 is included in the path of the second UL training signal. Thereafter, in operation 510, the BS 500 may deliver second indication information via the path of the second UL training signal, which includes the MS 502. The second indication information may be resource allocation information that an MS (e.g., the MS 502) included in the path of the second UL training signal requires to transmit the second UL training signal. The indication information may include configuration information (e.g., indication information for a transmit beam #m of an antenna m−1 of the MS 502, and a receive beam #n of an antenna 1 of the BS 500) for the path of the second UL training signal. In operation 512, the MS 502 may transmit the second UL training signal in response to the configuration information of the path, which is included in the second indication information. In other words, the MS 502 may transmit the second UL training signal via the transmit beam #m of its antenna m−1. The second UL training signal may be aperiodically transmitted just before the UL data transmission to the BS 500, in order to minimize the influence of changes in channel due to the movement of the MS 502.

In operation 514, the BS 500 may perform second UL channel measurement on the path (e.g., between the transmit beam #m of the candidate antenna m−1 of the candidate MS 502 and the receive beam #n of the candidate antenna 1 of the BS 500) using the second UL training signal. In operation 516, the BS 500 may perform second UL scheduling based on the results of the second UL channel measurement. For example, in the second UL scheduling process, the BS 500 may determine a transmission precoder value for the MS 502, select an MS that will constitute at least one final path via which the MS will transmit UL data, from among the candidate MSs that will transmit the second UL training signal, and allocate UL resources for UL data transmission. For example, the UL resources may include a UL transmission mode and a precoder value, which will be applied to each MS included in the at least one final path. In operation 518, the BS 500 may transmit, to the MS 502, third indication information that is generated depending on the results of the second UL scheduling. The third indication information may include, for example, configuration information for the at least one final path, the size and phase of the measured channel, a precoder value or a PMI, an RI, a CQI and the like.

As an example, it will be assumed that the final path is set as a transmit beam #m of an antenna m−1 of the MS 502 and a receive beam #n of an antenna 1 of the BS 500. In operation 520, the MS 502 may transmit UL data via the final path obtained through the third indication information.

Figure 5B:
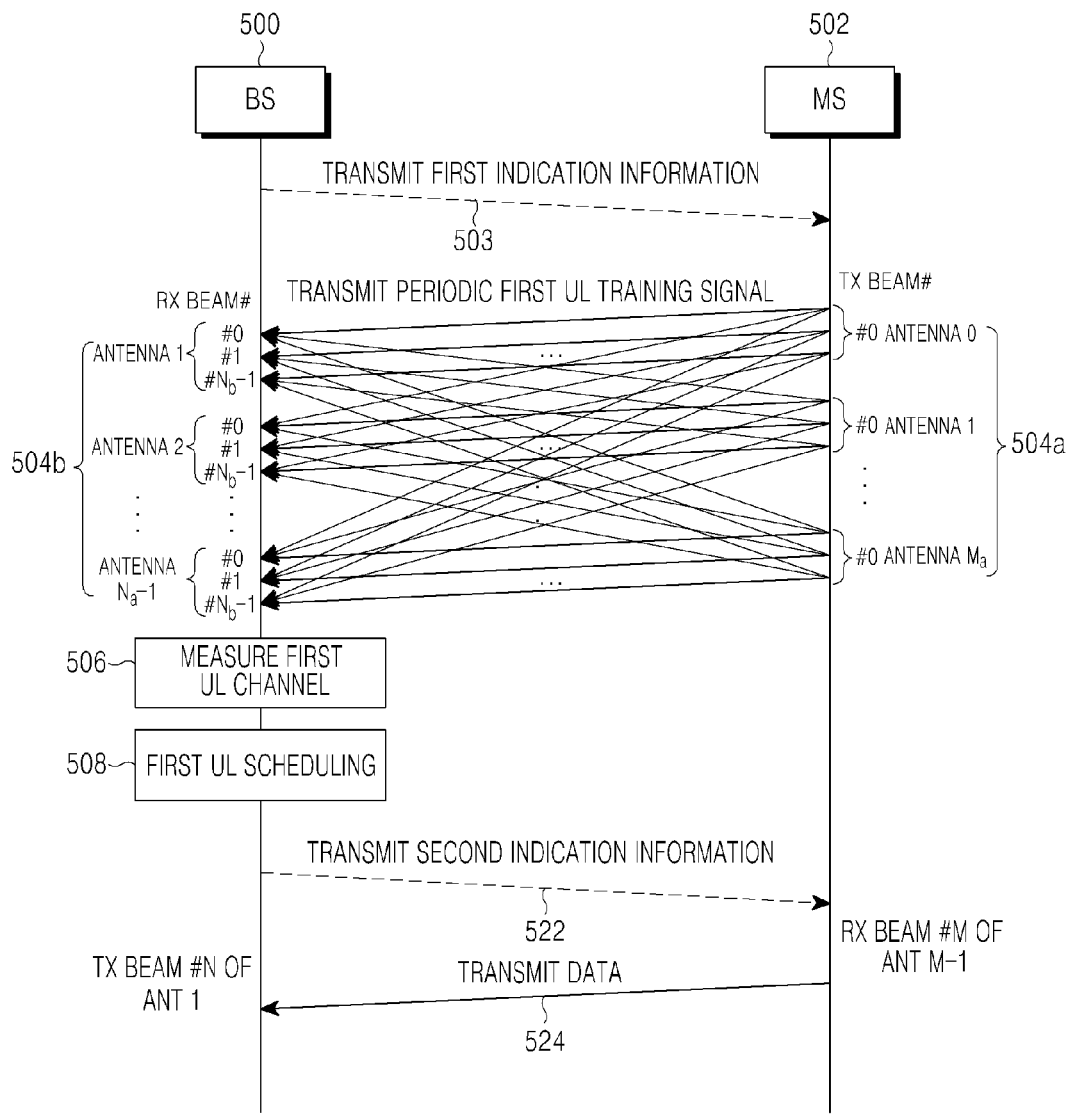
FIG. 5B is a signaling diagram illustrating another example of a scheduling operation of determining optimal transmit/receive beams in a UL according to a second embodiment of the present disclosure.

FIG. 5B is a signaling diagram illustrating another example of a scheduling operation of determining optimal transmit/receive beams in a UL according to a second embodiment of the present disclosure. The signaling diagram in FIG. 5B may correspond to a signaling diagram illustrating a scheduling operation in which in the first UL scheduling process of operation 508 in the embodiment of FIG. 5A, the BS 500 has determined not to perform transmission of the second UL training signal.

Referring to FIG. 5B, operations of the BS 500 and the MS 502 in operations 504a to 522 are the same as those in operations 504a to 510 in FIG. 5A, so a redundant description thereof will be omitted.

It will be assumed herein that as a result of the first UL scheduling in operation 508, there is a candidate combination (hereinafter referred to as a 'path of a second UL training signal'), the expected performance of which exceeds the predetermined performance reference, among the at least one candidate combination. In this case, the BS 500 may determine not to perform transmission of the second UL training signal. In operation 522, the BS 500 may transmit the second indication information to the MS 502.

In operation 524, the MS 502 may transmit UL data via the path corresponding to the candidate combination, which is obtained from the second indication information, by applying the UL transmission scheme for each path. The second indication information may be the same as the second indication information described in operation 510 of FIG. 5A.

Third Embodiment

In a third embodiment of the present disclosure, if a transmission angle and a beam width of each transmit beam are almost the same as a reception angle and a beam width of each receive beam for each antenna 1 mounted on each of BSs and MSs, the results of the first DL channel measurement by the MS may be used for the UL channel estimation and beamforming scheduling process. For example, upon receiving a first DL training signal that is periodically received, an MS may provide, to a BS, first feedback information including a channel value that the MS has estimated based on the first DL training signal. Then, the BS may perform first UL scheduling for determining at least one candidate combination that will periodically transmit a first UL training signal, based on the first feedback information for the first DL training signal. Therefore, the first UL scheduling according to the third embodiment may not require the UL training signal transmission process.

The BS may transmit first indication information including the first UL scheduling results to the MSs included in the at least one candidate combination. Thereafter, the BS may perform allocation of the final path and resources to be used for finally transmitting UL data, by performing second UL channel measurement and second UL scheduling on an aperiodic second UL training signal that is received via the path corresponding to the at least one candidate combination.

Figure 6:
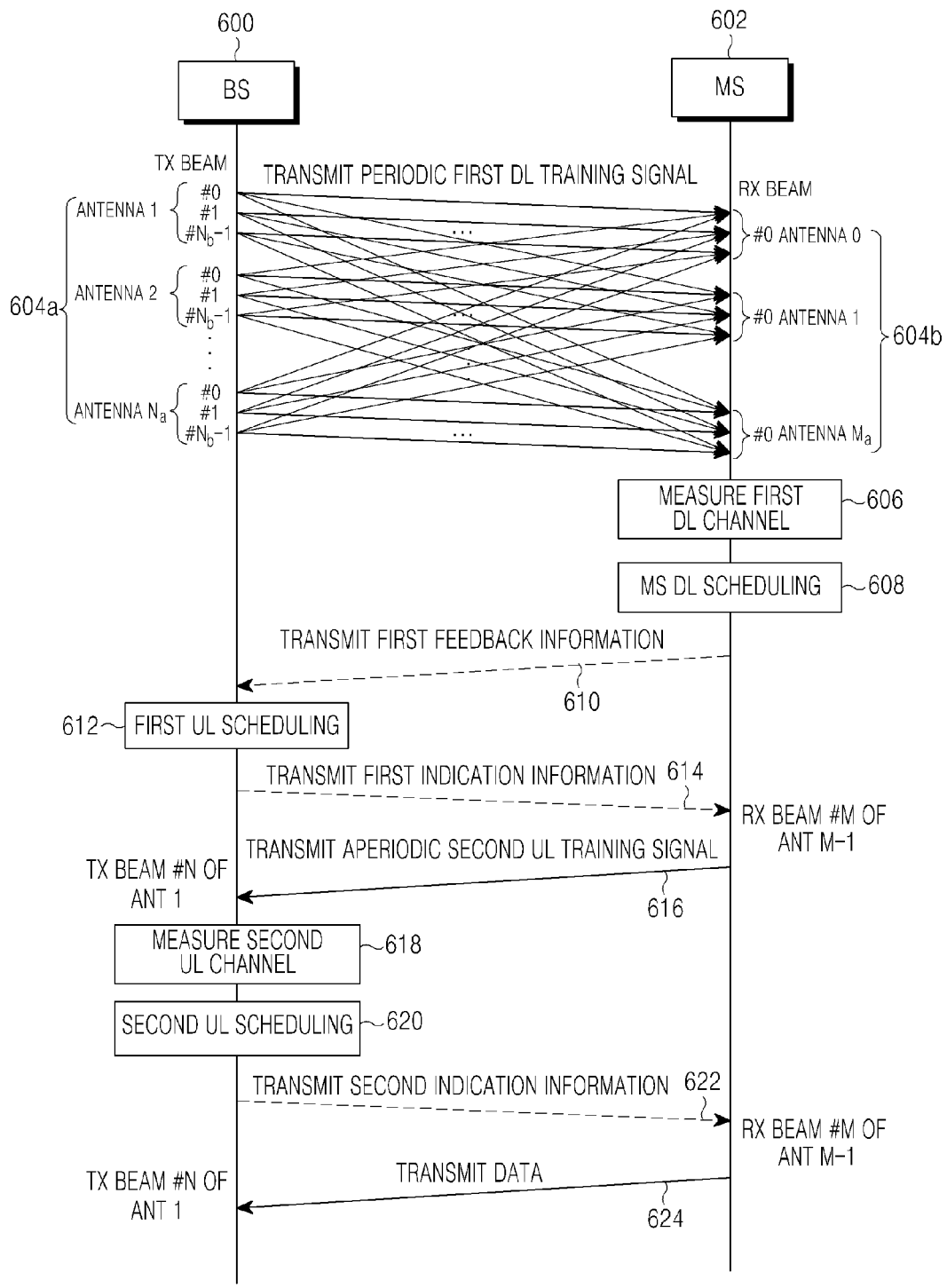
FIG. 6 is a signaling diagram illustrating an example of a scheduling operation of determining optimal transmit/receive beams in a UL based on feedback information of a DL training signal according to a third embodiment of the present disclosure.

FIG. 6 is a signaling diagram illustrating an example of a scheduling operation of determining optimal transmit/receive beams in a UL based on feedback information of a DL training signal according to a third embodiment of the present disclosure.

Referring to FIG. 6, it will be assumed that a BS 600 and an MS 602 have a total of Na antennas and a total of Ma antennas, respectively. For convenience of description, an operation of only the MS 602 is illustrated, which is one of a plurality of MSs located in the service coverage of the BS 600. However, the other MSs may also operate in the same way as in FIG. 5A.

In operation 604a, the BS 600 may generate a total of Nb transmit beams corresponding to each of Na antennas, and simultaneously transmit a first DL training signal via the Nb transmit beams for each antenna. The BS 600 may generate a total of Nb analog transmit beams for each antenna, but may transmit only one transmit beam at a time. Therefore, the BS 600 may repeatedly transmit a first DL training signal while sequentially switching a total of Nb transmit beams for each of a total of Na antennas for a predetermined period. The number of repetitions of the first DL training signal may correspond to the number of transmit beams for each of all antennas of the MS 602.

Thereafter, if the reception of the first DL training signal is completed for all transmit/receive beam combinations in operation 604b, the MS 602 may perform first DL channel measurement based on the first DL training signal for each of all the transmit/receive beam combinations in operation 606. In operation 608, the MS 602 may perform MS DL scheduling of determining at least one candidate combination in which, for example, the receive power or wideband CQI of the first DL training signals of all the transmit/receive beam combinations exceeds a preset threshold or has the maximum value, and of determining configuration information of the at least one candidate combination, through the first DL channel measurement process. In operation 610, the MS 602 may provide, to the BS 600, first feedback information including the results of the MS DL scheduling. For example, the first feedback information may include the at least one candidate combination and its configuration information, and a channel value corresponding to the at least one candidate combination.

In operation 612, the BS 600 may perform first UL scheduling using the first feedback information. For example, the BS 600 may determine scheduling metric values for the SU-MIMO mode and the MU-MIMO mode. The BS 600 may select one or both of the SU-MIMO mode and the MU-MIMO mode as a candidate DL transmission mode by comparing the determined scheduling metric values. The scheduling metric determination and comparison process will be described with reference to FIG. 12. The BS 600 may compare the performance expected during application of the candidate UL transmission mode selected for at least one candidate combination with a predetermined performance reference, and determine whether to transmit a second UL training signal that the BS 600 transmits aperiodically, depending on the comparison results.

It will be assumed that there is no candidate combination, the expected performance of which exceeds a predetermined performance reference. Then, the BS 600 may determine to perform a transmission process for a second UL training signal. In operation 614, the BS 600 may transmit first indication information to the MS 602 included in the path of the second UL training signal, the first indication information including a transmission instruction for the second UL training signal, and configuration information for a candidate combination (hereinafter referred to as a 'path of a second UL training signal'), the expected performance of which exceeds the predetermined performance reference, among the at least one candidate combination.

Upon receiving the first indication information, the MS 602, which is one of the MSs included in the path of the second UL training signal, may transmit an aperiodic second UL training signal via an antenna and a transmit beam corresponding to the configuration information for the path obtained through the first indication information in operation 616.

In operation 618, the BS 600 may perform second UL channel measurement on the MSs that have transmitted the second UL training signal, based on the second UL training signal. In operation 620, the BS 600 may perform second UL scheduling of selecting the final path to be used for finally transmitting the UL data among the paths of the second UL training signal, and of allocating UL resources for UL data transmission.

In operation 622, the BS 600 may transmit, to the MS 602, second indication information that is generated depending on the results of the second UL scheduling. The second indication information may include, for example, configuration information for the final path, the UL resources (e.g., the size and phase of the measured channel), a precoder value or a PMI, an RI, a CQI and the like.

As an example, it will be assumed that the final path is set as a transmit beam #m of a candidate antenna m−1 of the MS 602 and a receive beam #n of a candidate antenna 1 of the BS 600. Then, in operation 624, the MS 602 may transmit UL data via the final path obtained through the second indication information.

The first and second DL/UL training signals that the BS and the MS transmits and receives according to embodiments of the present disclosure may be designed taking into account the interference between adjacent cells. For example, in an embodiment of the present disclosure, all cells may be classified into a predetermined number of, for example, Nc cell types, and signals in different cell types may be allocated different frequency resources so that the frequency resources may not overlap. It will be assumed that each of the cells has Na antennas, and each of the antennas generates Nb transmit beams. Then, each of the cells may simultaneously transmit Na training signals via Na antennas. A training signal transmitted via each antenna may be uniquely determined by a number c (c=0, 1, . . . , Nc−1) of the cell type and a number a (a=0, 1, . . . , Na−1) of the antenna. Each of the antennas may transmit Nb training signals corresponding to a total of Nb transmit beams while sequentially switching the transmit beams. An identifier b of a transmit beam may be set to correspond to the number 'b' of repetitions of a training signal (b=0, 1, . . . , Nb−1). As a specific example, it will be assumed that a training signal is designed based on the OFDM scheme. In this case, if a training signal designed as an OFDM signal is assumed to include N subcarriers, the training signal may be designed such that a subcarrier 'n' satisfying Equation (1) below has a signal value and another subcarrier unsatisfying Equation (1) has no signal value (e.g., has a signal value of zero (0)).

$$n=a+(c*Na)+(k*Nc*Na) \text{ or } n=c+(a*Nc)+(k*Na*Nc) \quad \text{Equation (1)}$$

where k=0, 1, . . . , (N/(Nc*Na))−1.

For example, it will be assumed that the number of cell types is 'Nc=3', the number of antennas is 'Na=4', and each antenna generates 'Nb=40' transmit beams. Then, a cell 'c' may simultaneously transmit OFDM training signals via each of 4 antennas. Each antenna may transmit an OFDM training signal while sequentially changing the transmit beams, and the change order of the transmit beams may correspond to 'b=0, 1, . . . , 39'. In this case, in accordance with Equation (1), for the OFDM training signal, signal values may be set as 'subcarrier n=a+4c+12k' or 'n=c+3a+12k, k=0, 1, . . . (N/12)−1', and in the other subcarriers, signal values may be set as '0'.

Figure 7:
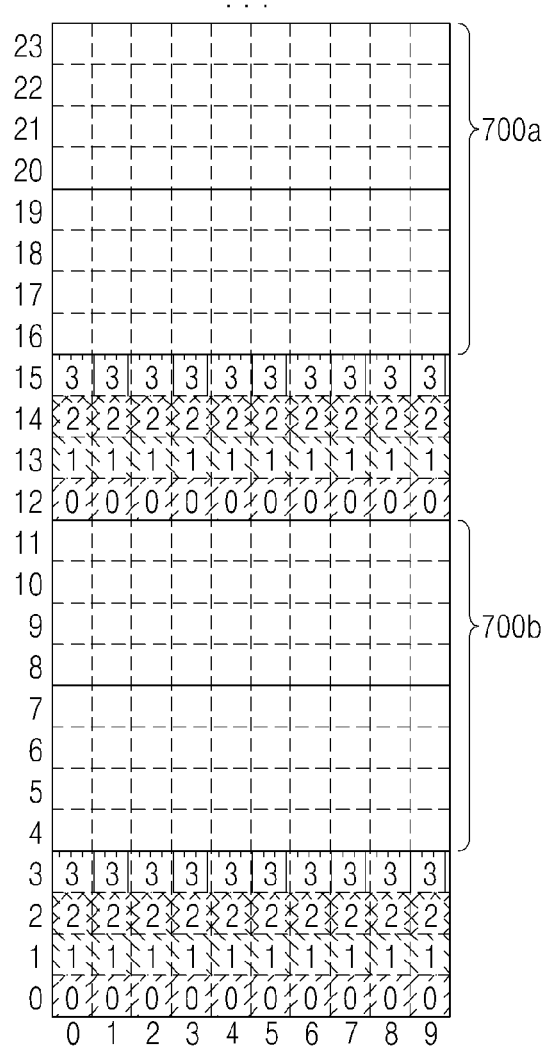
FIG. 7 illustrates an example of an Orthogonal Frequency Division Multiplexing (OFDM) training signal designed according to an embodiment of the present disclosure.

FIG. 7 illustrates an example of an OFDM training signal designed according to an embodiment of the present disclosure. It will be assumed herein that the OFDM training signal has a cell type of c=0.

Referring to FIG. 7, the horizontal axis represents OFDM symbols, and the vertical axis represents OFDM subcarriers. For an OFDM training signal, signal values of subcarriers #0 to #3 may be allocated and signal values of subcarriers #12 to #15 may be allocated. Signals values of subcarriers #4 to #11 are not allocated. An OFDM training signal according to an embodiment of the present disclosure may reduce the interference between adjacent cells, since the regions 700a and 700b where signal values are not allocated are differently set for each cell type and each antenna.

As illustrated in FIG. 7, in order to reduce the interference between adjacent cells for a training signal, an OFDM training signal may be allocated for each subcarrier having a predetermined interval. In this case, the number of subcarriers that actually transmit the OFDM training signal may be reduced, causing a decrease in accuracy of the OFDM training signal. In a case where the transmitted OFDM training signal replaces the above-described first UL/DL training signal, in order to overcome these drawbacks, a second UL/DL training signal may be transmitted according to an embodiment of the present disclosure after the transmission of the OFDM signals, making it possible to increase the accuracy of the previously transmitted first UL/DL training signal.

In accordance with another embodiment of the present disclosure, a periodic first DL/UL training signal and an aperiodic second DL/UL training signal may be designed by allocating an orthogonal code to each combination that includes a cell type number and an antenna number. In further another embodiment, a periodic first DL/UL training signal and an aperiodic second DL/UL training signal may be designed by allocating codes that are orthogonal with each other for each cell type, and by allocating antenna numbers to different frequencies/subcarriers. In yet another embodiment, a periodic first DL/UL training signal and an aperiodic second DL/UL training signal may be designed by allocating different frequencies/subcarriers for each cell type, and by allocating an orthogonal code for each antenna number.

Figure 8:
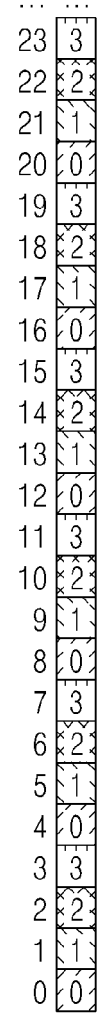
FIG. 8 illustrates another example of an OFDM training signal designed according to an embodiment of the present disclosure.

FIG. 8 illustrates another example of an OFDM training signal designed according to an embodiment of the present disclosure.

Referring to FIG. 8, an example of an aperiodic second DL training signal according to the first embodiment of the present disclosure. The OFDM training signal in FIG. 8 may also be used as a periodic first DL/UL training signal. In this case, the first DL/UL training signal may be repeatedly transmitted as many times as the total number 'Nb' of beams while sequentially switching the beams.

If the total number of antennas is 4, each antenna 'a' (a=0, 1, 2, 3) may transmit a signal only in "subcarrier n=a+(k*Na), k=0, 1, . . . , (N/Na)−1" where its own number is shown. A training signal that is transmitted via each antenna may be generated using the codes that are orthogonal with each other according to the cell type.

Figure 9:
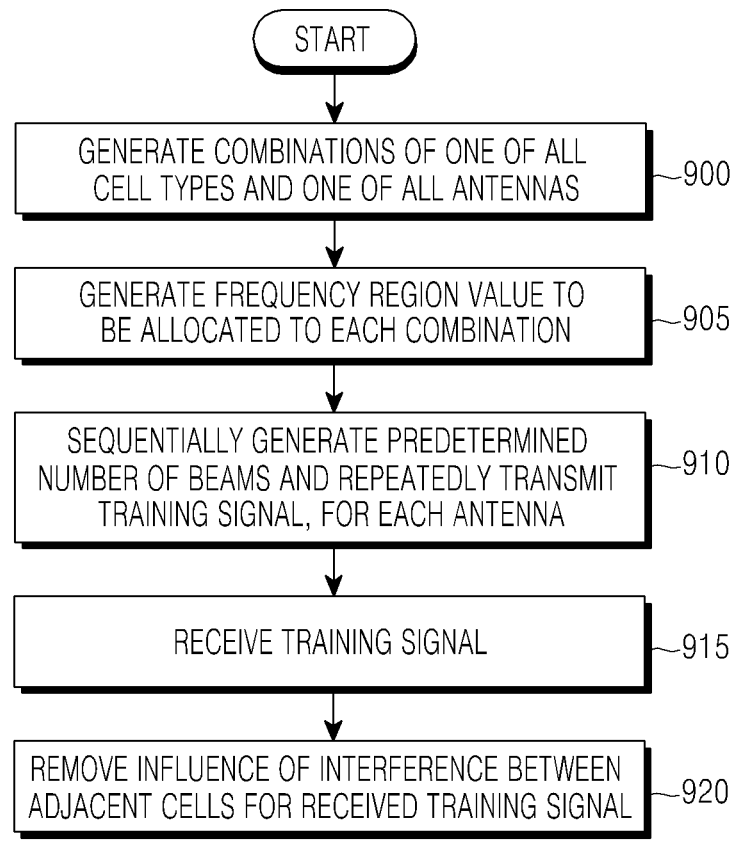
FIG. 9 is a flowchart illustrating an operation of generating and transmitting/receiving a training signal according to an embodiment of the present disclosure.

FIG. 9 is a flowchart illustrating an operation of generating and transmitting/receiving a training signal according to an embodiment of the present disclosure.

Referring to FIG. 9, a training signal generated herein represents one of first and second DL/UL training signals which are generated by an MS or a BS in each of the embodiments described above, and the generated signal will be referred to as a training signal for convenience of description.

In operation 900, a BS or an MS may generate combinations, each of which includes one of a preset number of cell types and one of all antennas mounted thereon.

In a transmission operation, the BS or the MS may generate a frequency region value Xn (n=0, 1, . . . , N−1) that the BS or the MS will allocate to each combination, in operation 905. For example, the BS or the MS may set an absolute value of Xn as 1 or 0 (e.g., |Xn|=1 or 0, n=0, 1, . . . , N−1). Thereafter, the BS or the MS may convert the frequency-domain training signal into a time-domain training signal xk by Inverse Fast Fourier Transform (IFFT).

In operation 910, the BS or the MS may generate, for example, Nb beams for each antenna (e.g., sequentially generate a beam #b (b=0, 1, . . . , Nb−1)), and repeatedly transmit the same OFDM training signal xk in each beam. In this training signal transmission process, if the training signal is a first UL/DL training signal, the training signal will be transmitted for all transmit/receive beam combinations as described above. If the training signal is a second UL/DL training signal, the training signal may be transmitted via the path of the second UL/DL training signal that is determined according to the first to third embodiments.

Thereafter, in a reception operation, the MS or the BS may receive, in operation 915, the OFDM training signal that was transmitted through operations 900 to 910. As an example, if a Fast Fourier Transform (FFT) start point of a received b-th OFDM training signal yk is found, the BS or the MS may perform FFT on the received signal in an FFT interval. If a frequency region value Yn of the received signal is multiplied by a conjugate of a training signal Xn in the next subcarrier 'n', a channel value (e.g., Zn=Xn*Yn, n=0, 1, . . . , N−1) for a beam 'b' generated in the desired cell and antenna may be obtained. In operation 920, the MS or the BS may remove the influence of the noise and the interference between adjacent cells from the received signal Zn. For example, the MS or the BS may convert the received signal Zn into a time-domain signal $z_k$ by IFFT. As shown in Equation (2) below, if the magnitude of the signal $z_k$ is less than a predetermined reference value, the corresponding value may be designated as zero (0).

$$h_k = \begin{cases} z_k, & \text{if } |z_k| \geq T \\ 0, & \text{if } |z_k| < T \end{cases} \quad \text{Equation (2)}$$

Thereafter, the MS or the BS may obtain a channel value (e.g., a frequency-domain signal $H_n$) for the beam 'b' generated in the desired cell and antenna by performing FFT on the next $h_k$.

Figure 10:
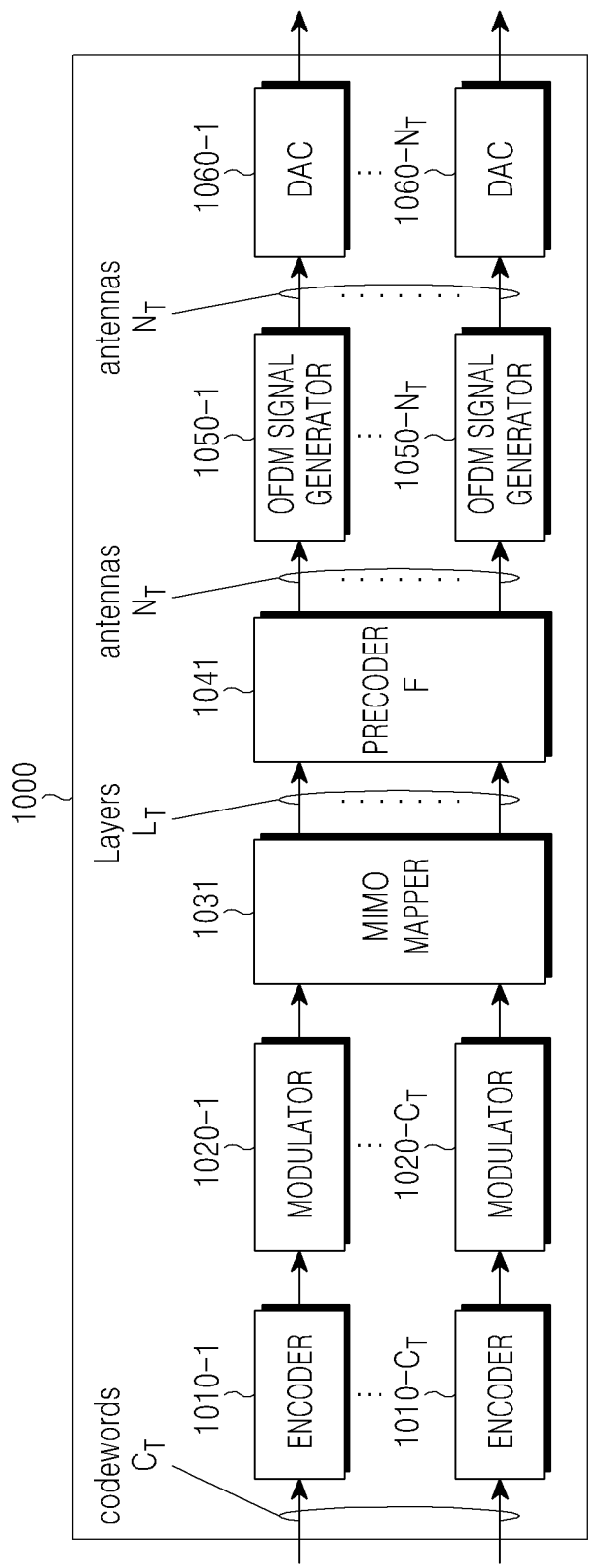
FIG. 10 is a block diagram of a beamforming transmitter according to an embodiment of the present disclosure.

FIG. 10 is a block diagram of a beamforming transmitter according to an embodiment of the present disclosure.

Referring to FIG. 10, it is assumed herein that a transmitter 1000 has a total of $N_T$ antennas, and each antenna has a total of $N_{Tb}$ transmit/receive beams.

The transmitter 1000 may include encoders 1010-1~1010-$C_T$, modulators 1020-1~1020-$C_T$, a MIMO mapper 1031, a precoder 1041, $N_T$ OFDM signal generators 1050-1~1050-$N_T$ (where $N_T$ represents the number of transmit antennas), and Digital-to-Analog Converters (DACs) 1060-1~1060-$N_T$.

The encoders 1010-1~1010-$C_T$ may encode $C_T$ input bit sequences, and provide the encoded input bit sequences to their associated modulators 1020-1~1020-$C_T$. Each of the modulators 1020-1~1020-$C_T$ may convert the encoded input bit sequence into Quadrature Amplitude Modulation (QAM) or Phase Shift Keying (PSK) symbols. The MIMO mapper 1031 may map $C_T$ QAM or PSK symbols to, for example, $L_T$ symbol groups. Thereafter, the precoder 1041 may convert a symbol group 's' into a signal 'x' for $N_T$ antennas by performing digital beamforming thereon using Equation (3) below.

$$x = Fs \quad \text{Equation (3)}$$

where $$x = \begin{bmatrix} x_0 \\ \vdots \\ x_{N-1} \end{bmatrix}, F = \begin{bmatrix} f_{0,0} & \cdots & f_{0,L-1} \\ \vdots & \ddots & \vdots \\ f_{N-1,0} & \cdots & f_{N-1,L-1} \end{bmatrix}, \text{and}$$

$$s = \begin{bmatrix} s_0 \\ \vdots \\ s_{L-1} \end{bmatrix}.$$

If digital beamforming and precoding are not performed, the signal 'x' may correspond to an identity matrix with $N_T = L_T$ and x=x in which for a precoder F, diagonal terms all have a value of '1' and the other terms all have a value of '0'.

Thereafter, each of the OFDM signal generators 1050-1~1050-$N_T$ may generate an OFDM training signal based on the signal received from the precoder 1041 using one of the above-described methods of designing the training signal. The process of generating an OFDM training signal may include a process of Serial-to-Parallel (S/P)-converting a signal received from the precoder 1041, performing IFFT on the S/P-converted signal, Parallel-to-Serial (P/S)-converting the IFFT-transformed signal, copying the last part of an IFFT block, and inserting the copied part at the beginning of the IFFT block as a Cyclic Prefix (CP). Each of the DACs 1060-1~1060-$N_T$ may convert the OFDM training signal into an analog signal.

In other words, the transmitter 1000 according to an embodiment of the present disclosure may convert $N_T$ transmission analog signals with a desired frequency, and then transmit each of the converted analog signals via the above-described analog beamforming antenna, which is any one of the antennas shown in FIGS. 1 to 3. The transmitter 1000 may apply a variety of MIMO and digital beamforming technologies using the MIMO mapper 1031 and the precoder 1041.

Figure 11:
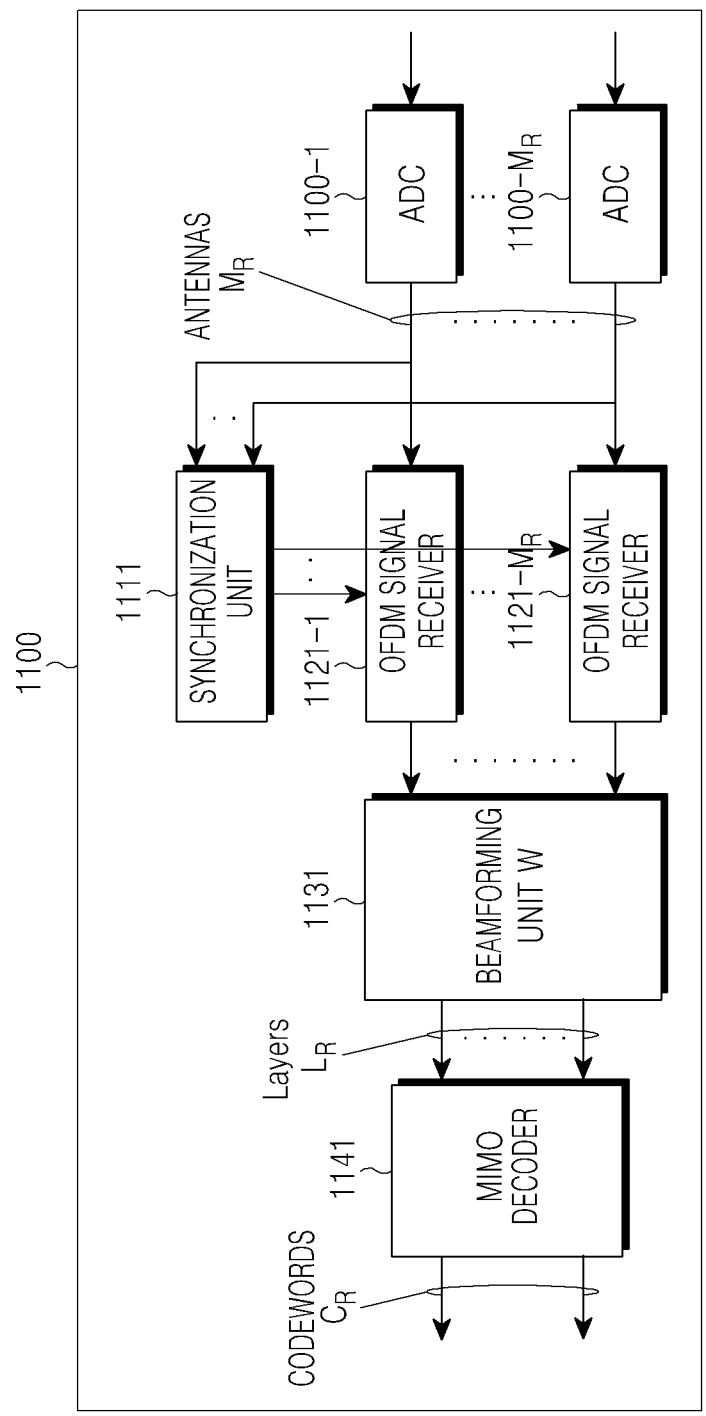
FIG. 11 is a block diagram of a beamforming receiver according to an embodiment of the present disclosure.

FIG. 11 is a block diagram of a beamforming receiver according to an embodiment of the present disclosure.

Referring to FIG. 11, a beamforming receiver 1100 may include $M_R$ ADCs 1100-1~1100-$M_R$ (where $M_R$ represents the number of receive antennas), a synchronization unit 1111, OFDM signal receivers 1121-1~1121-$M_R$, a beamforming unit 1131, and a MIMO decoder 1141.

The ADCs 1100-1~1100-$M_R$ may convert analog signals received via their associated antennas among the $M_R$ antennas into digital signals, and provide the digital signals to the OFDM signal receivers 1121-1~1121-$M_R$, respectively. The synchronization unit 1111 may synchronize the beamforming receiver 1100 with the transmitter 1000 in terms of time and frequency. The beamforming unit 1131 may convert $M_R$ received signals into a received signal 'r' each including $L_R$ elements using Equation (4) below.

$$r = Wy \quad \text{Equation (4)}$$

where $$r = \begin{bmatrix} r_0 \\ \vdots \\ r_{L-1} \end{bmatrix}, W = \begin{bmatrix} w_{0,0} & \cdots & w_{0,M-1} \\ \vdots & \ddots & \vdots \\ w_{L-1,0} & \cdots & w_{L-1,M-1} \end{bmatrix}, \text{and}$$

$$y = \begin{bmatrix} y_0 \\ \vdots \\ y_{M-1} \end{bmatrix}.$$

Finally, the MIMO decoder 1141 may detect a bit sequence from the received signal 'r'.

In other words, the beamforming receiver 1100 according to an embodiment of the present disclosure may receive a signal by simultaneously using $M_R$ analog beamforming antennas having an antenna form shown in any one of FIGS. 1 to 3, and frequency-convert $M_R$ analog signals into a baseband signal. Thereafter, the beamforming receiver 1100 may receive the signal using $M_R$ ADCs and the like. Similarly, the beamforming receiver 1100 may also receive a signal by additionally performing Rx MIMO and digital beamforming using the beamforming unit 1131 and the MIMO decoder 1141.

Figure 12:
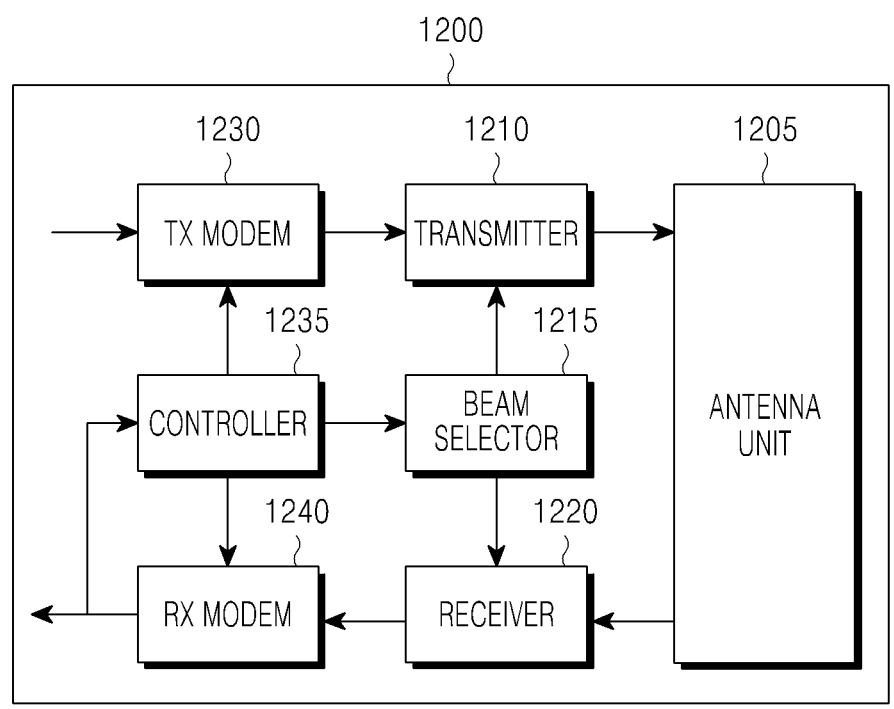
FIG. 12 illustrates a structure of an apparatus for a Base Station (BS) or a Mobile Station (MS) according to an embodiment of the present disclosure.

FIG. 12 illustrates a structure of an apparatus for a BS or an MS according to an embodiment of the present disclosure.

Referring to FIG. 12, an apparatus 1200 may operate as a BS or an MS according to embodiments of the present disclosure, and may include an antenna unit 1205, a transmitter 1210, a beam selector 1215, a receiver 1220, a transmitting modem 1230, a controller 1235, and a receiving modem 1240. Although it is assumed herein that the controller 1235 and the beam selector 1215 are configured separately by way of example, the controller 1235 and the beam selector 1215 may be configured as a single unit according to another embodiment of the present disclosure.

The transmitting modem 1230 may include the above-described beamforming transmitter 1000 in FIG. 10, and the receiving modem 1240 may include the beamforming receiver 1100 in FIG. 11.

The transmitter 1210 and the receiver 1220 may include the above-described switch 103 in FIG. 1, or the phase shifters 203-1~203-N in FIG. 2A. The antenna unit 1205 may include any one of the antennas in FIGS. 1 to 3. The controller 1235 may control an operation that is performed by the transmitting module 1230 and the receiving modem 1240 to transmit and receive a periodic first DL/UL training signal and an aperiodic second DL/UL training signal according to embodiments of the present disclosure; an operation of selecting an antenna, a beam, a MIMO mode and a beamforming mode for a BS and an MS depending on the measurement results; and an operation of transmitting feedback information or indication information.

The antenna unit 1205 may include a plurality of antennas. The plurality of antennas may have any one of the forms of, for example, the above-described horn antennas and array antennas illustrated in FIGS. 1 to 3, and may form a plurality of beams.

For example, if the antenna unit 1205 includes array antennas as illustrated in FIGS. 2A and 2B, the beam selector 1215 may store all of the values and signal magnitudes of phase shifters for each antenna, or the switch value in FIG. 1, and may output a value corresponding to a unique number of the beam selected by the controller 1235, to the transmitter 1210 or the receiver 1220.

The transmitter 1210 or the receiver 1220 may cause the beam selector 1215 to generate a beam corresponding to the set value for each antenna.

As another example, the beam selector 1215 may apply the beamforming according to an embodiment of the present disclosure, even if the antenna unit 1205 includes the independent antennas having the same form as those of the beamforming transmitter 1000 illustrated in FIG. 10 and the beamforming receiver 1100 illustrated in FIG. 11. In this case, the beam selector 1215 may use the codebook values used in the precoder 1041 in FIG. 10 and the beamforming unit 1131 in FIG. 11, as the values of the phase shifters in FIGS. 2A and 2B, which are used for generating analog beams according to an embodiment of the present disclosure. In other words, the beam selector 1215 may perform a function of switching transmit beams of transmit antennas or receive beams of receive antennas by changing the codebook index.

The receiving modem 1240, under control of the controller 1235, may measure the power or the CQI value (e.g., signal-to-noise ratio) of a periodic first DL/UL training signal and an aperiodic second DL/UL training signal, which are received via each antenna and its beam by means of the antenna unit 1205. In other words, the receiving modem 1240 may perform the above-described first DL channel measurement process and first UL channel measurement process according to the first to third embodiments of the present disclosure.

First, it will be assumed that the apparatus 1200 operates as a BS or an MS in a DL according to the first embodiment of the present disclosure. In this case, the apparatus 1200 operating as a BS or an MS may operate in accordance with the signaling diagrams of FIGS. 4A and 4B. If the apparatus 1200 operates as a BS, a situation will be considered in which the antenna unit 1205 has Na antennas and a plurality of beams may be simultaneously generated for each antenna, so for example, Nb beams may be generated. In contrast, if the apparatus 1200 operates as an MS according to the first embodiment, a situation will be considered in which the antenna unit 1205 has a total of Ma antennas and a plurality of beams may be generated for each antenna, so for example, Mb beams may be simultaneously generated.

Then, the controller 1235 may perform first DL channel measurement based on the first DL training signal according to the first embodiment, which is received through the receiving modem 1240 and the receiver 1220, and generate first feedback information based on the results thereof. The controller 1235 may generate the first feedback information including a CQI, the complexity of which is reduced using various methods for reducing the complexity of the CQI, which is one of the information included in the first feedback information.

For example, in a DL, in the case of the apparatus 1200 operating as a BS, the antennas included in the antenna unit 1205 may operate as transmit antennas. In the case of the apparatus 1200 operating as an MS, the antennas included in the antenna unit 1205 may operate as receive antennas. For example, a CQI determined by receiving a signal of a transmit beam 'b' of a transmit antenna 'a' of a BS via a receive beam β of a receive antenna α of a specific MS 'u', and measuring the received signal, may be written as Equation (5) below.

$$CQI\{b(a) \rightarrow \beta(\alpha,u)\} \qquad \text{Equation (5)}$$

where 'a' denotes an indicator of a transmit antenna of a BS, 'b' denotes an indicator of a transmit beam of the BS, 'u' denotes an indicator of MSs located in the service coverage of the BS, 'α' denotes an indicator of a receive antenna of an MS, and 'β' denotes an indicator of a receive beam of the MS.

In the ideal case, the apparatus 1200 operating as an MS should determine CQI values for all transmit/receive beam combinations of receive beams for each of all receive antennas included in its antenna unit 1205 and transmit beams for each of all transmit antennas included in the antenna unit 1205 of the apparatus 1200 operating as a BS, using Equation (5), and should include the determined CQI values in the first feedback information. In this case, the performance of the scheduling may be maximized since channel values for all transmit/receive beam combinations can be determined. However, if the first feedback information includes CQI values for all transmit/receive beam combinations, UL resources may be wasted, causing a decrease in communication efficiency. Therefore, in order to minimize the decrease in UL communication efficiency, the first feedback information according to embodiments of the present disclosure may be generated to include CQI values determined by the following complexity reduction scheme.

As a specific example, the controller 1235 of the apparatus 1200 operating as a specific MS 'u' may detect an optimal beam combination that includes an optimal receive antenna $\alpha_{opt}$, an optimal receive beam $\beta_{opt}$, an optimal transmit antenna $a_{opt}$ and an optimal transmit beam $b_{opt}$ having the maximum receive power value in accordance with Equation (6) below, among all the transmit/receive beam combinations. The controller 1235 may generate configuration information for the optimal beam combination (e.g., indicators of a receive antenna, a receive beam, a transmit antenna and a transmit beam constituting the optimal beam combination) and a CQI value determined based thereon, as an example of the first feedback information.

$$CQI\{b_{opt}(a_{opt}) \rightarrow \beta_{opt}(\alpha_{opt},u)\} = \max_{a,b,\alpha,\beta} CQI\{b(a) \rightarrow \beta(\alpha,u)\} \qquad \text{Equation (6)}$$

In this case, if the configuration information only for the optimal beam combination is included in the first feedback information, the information that the BS that has received the first feedback information may consider in its first DL scheduling process may be too limited. Therefore, in accordance with another embodiment, an optimal transmit beam indicator, indicators of an optimal receive antenna and an optimal receive beam, and a CQI value determined based thereon may be included in the first feedback information, for each of transmit antennas (a=0, 1, ..., N−1) of the BS as shown in Equation (7) below.

$$CQI\{b_{opt}(a_{opt}) \rightarrow \beta_{opt}(\alpha_{opt},u)\} = \max_{a,b,\alpha,\beta} CQI\{b(a) \rightarrow \beta(\alpha,u)\}, a=0, 1, \ldots, N-1 \qquad \text{Equation (7)}$$

In yet another embodiment, in order to further increase the scheduling performance of the BS, indicators ($b_{opt}(a), \beta_{opt}(\alpha, u)$) of optimal transmit beam and receive beam, and a CQI value CQI$\{b_{opt}(a) \to \beta_{opt}(\alpha, u)\}$ determined based thereon may be included in the first feedback information, for each antenna combination (a, $\alpha$) including each of transmit antennas (a=0, 1, ..., N−1) of the BS and each of receive antennas ($\alpha$=0, 1, ..., M−1) of the MS, as shown in Equation (8) below.

$$CQI\{b_{opt}(a) \to \beta_{opt}(\alpha,u)\} = \max_{b,\beta} CQI\{b(a) \to \beta(\alpha,u)\},$$
$$a=0, 1, \ldots N-1, \alpha=0, 1, \ldots, M-1 \quad \text{Equation (8)}$$

In order to further increase the scheduling performance of the BS in accordance with yet another embodiment, indicators ($b_{2nd}(a), \beta_{opt}(\alpha, u)), (b_{3rd}(a), \beta_{opt}(\alpha, u)), \ldots$ for the second and third best beams $b_{2nd}, b_{3rd}, \ldots$, and a CQI value determined based thereon may be included in the first feedback information, for each transmit antenna 'a' of the BS for optimal receive antenna and receive beam) $\beta_{opt}(\alpha_{opt}, u)$ of the MS, or for an optimal receive beam $\beta_{opt}(\alpha, u)$ for each receive antenna, as shown Equation (9).

$$CQI\{b_{opt}(a) \to \beta_{opt}(\alpha,u)\} > CQI\{b_{2nd}(a) \to \beta_{opt}(\alpha,u)\} > CQI\{b_{3rd}(a) \to \beta_{opt}(\alpha,u)\} > \ldots \quad \text{Equation (9)}$$

In accordance with another embodiment, the first feedback information may include numbers (or indicators) ($b(a), \beta_{opt}(\alpha, u)$) of a transmit antenna 'a' and a transmit beam 'b' of the BS, CQI values of which are less than a predetermined reference value $CQI_{LOW}$, for an optimal receive beam for each receive antenna of each MS, as shown in Equation (10).

$$CQI\{b(a) \to \beta_{opt}(\alpha,u)\} < CQI_{LOW}, a=0, 1, \ldots, N-1,$$
$$\alpha=0, 1, \ldots, M-1 \quad \text{Equation (10)}$$

In an embodiment for reducing the amount of data of the first feedback information, various data compression techniques may be applied to the CQI value included in the first feedback information. For example, indicators of a transmit antenna 'a' and a transmit beam 'b' of the BS, CQI values of which are less than the reference value $CQI_{LOW}$, may be represented in the form of bit map. The first feedback information may include information about the DL transmission mode that the BS will use during its actual data transmission, based on the first DL training signal transmitted by the BS. In this case, the controller 1235 may determine one of the SU-MIMO mode and the MU-MIMO mode as a candidate DL transmission mode for the BS, based on the first DL training signal received from the BS.

First, if the apparatus 1200 operates as an MS, the controller 1235 may represent the signal received through the antenna unit 1205, as shown in Equation (11). It will be assumed that a first DL training signal 'x' transmitted via each transmit beam b(a) (a=0, 1, ... N−1) of a transmit antenna 'a' of the BS is received via a receive beam $\beta(\alpha)(\alpha=0, 1, \ldots, M-1)$ of a receive antenna $\alpha$ of one MS 'u' among the MSs located in the service coverage of the BS.

$$y = HFs + n \quad \text{Equation (11)}$$
$$r = WHFs + Wn$$

where $$y = \begin{bmatrix} y_0 \\ \vdots \\ y_{M-1} \end{bmatrix}, H = \begin{bmatrix} h_{0,0} & \cdots & h_{0,N-1} \\ \vdots & \ddots & \vdots \\ h_{M-1,0} & \cdots & h_{M-1,N-1} \end{bmatrix},$$

-continued $$F = \begin{bmatrix} f_{0,0} & \cdots & f_{0,L-1} \\ \vdots & \ddots & \vdots \\ f_{N-1,0} & \cdots & f_{N-1,L-1} \end{bmatrix}, s = \begin{bmatrix} s_0 \\ \vdots \\ s_{L-1} \end{bmatrix},$$

$$n = \begin{bmatrix} n_0 \\ \vdots \\ n_{M-1} \end{bmatrix} r = \begin{bmatrix} r_0 \\ \vdots \\ r_{L-1} \end{bmatrix},$$

$$W = \begin{bmatrix} w_{0,0} & \cdots & w_{0,M-1} \\ \vdots & \ddots & \vdots \\ w_{L-1,0} & \cdots & w_{L-1,M-1} \end{bmatrix}.$$

In Equation (11), 'H' denotes a channel matrix, 'F' denotes a precoder that the BS uses when transmitting data, 's' denotes a transmission symbol, and 'n' denotes noise. In addition, 'r' denotes a received signal that is finally obtained by applying reception digital beamforming to a received signal y, and W denotes a reception digital beamforming value.

Assuming the SU-MIMO environment, the controller 1235 may determine a data transfer rate for the MS 'u' using Equation (12) below.

$$R_{SU-MIMO}(\bar{b}, \bar{\beta}(\bar{\alpha}, u), F) = \log\det(I + \gamma WHFQF^*H^*W^*) \quad \text{Equation (12)}$$
$$= \log\det(I + \gamma HFQF^*H^*)$$

where $\gamma$ denotes a ratio of received noise power to transmit symbol power, and Q denotes a covariance matrix of a transmitted symbol 's' or may be an identity matrix (Q=I). In addition, a reception beamforming matrix W may be a unitary matrix, WW*=W*W=I, and $\bar{b}=[b(0) \ldots b(N-1)]$ denotes a unique number of a beam used in a BS antenna a=0, 1, ..., N−1. Further, $\bar{\alpha}[\alpha_0 \ldots \alpha_{M-1}]$ denotes unique numbers of M antennas mounted on the MS, and indicates that the order of beams is arbitrarily changed at the number of 0, 1, ..., M−1. In other words, $\alpha_m \in \{0, 1, \ldots, M-1\}$, m=0, 1, ..., M−1, and if m≠k as they are unique to each other, $\alpha_m \neq \alpha_k$ may be satisfied. Moreover, $\bar{\beta}(\bar{\alpha}, u) = [\beta(\alpha_0, u) \ldots \beta(\alpha_{M-1}, u)]$ denotes beam number vectors selected at M antennas of the MS 'u'.

If the controller 1235 has information about a CQI value for the optimal beam combination, the controller 1235 may determine a precoder for maximizing the data transfer rate determined by Equation (12), using Equation (13) below.

$$R_{SU-MIMO}(\bar{b}, \bar{\beta}(\bar{\alpha},u), F_{opt}) = \max_p \log\det(I + \gamma HFQF^*H^*) \quad \text{Equation (13)}$$

If the BS does not perform digital precoding, F may be an identity matrix (F=I). If the maximum value of the data transfer rate determined in accordance with Equation (13) is similar to a value of a data transfer rate in a case where precoding is not performed (e.g., F=I). In other words, if the performance improvement of the data transfer rate due to the digital precoding is less than a predetermined reference, the controller 1235 may determine that the precoding is not effective. In this situation, the controller 1235 may determine to transmit data only with analog beamforming without performing digital precoding. In addition, if the controller 1235 has information about the optimal beam combination, the controller 1235 may determine a scheduling metric value of the MS. For example, assuming that the controller 1235 uses a Proportional Fair (PF) scheduling algorithm, the controller 1235 may determine an SU-MIMO scheduling metric of the MS 'u' based on the optimal beam combination, using Equation (14) below.

$$P_{SU-MIMO}(\bar{b}, \bar{\beta}(\bar{\alpha},u), F_{opt}) = R_{SU-MIMO}(\bar{b}, \bar{\beta}(\bar{\alpha},u), F_{opt})/T(u) \quad \text{Equation (14)}$$

where T(u) denotes average throughput of the MS 'u'.

The controller 1235 may find the optimal beam combination including the optimal transmit beam and receive beam for maximizing the SU-MIMO scheduling metric value shown as in Equation (14). For example, the controller 1235 may determine the maximum value of the data transfer rate that can be obtained during application of SU-MIMO to the BS, using Equation (15) below.

$$R_{SU\text{-}MIMO}(\bar{b}_{opt}, \bar{\beta}_{opt}(\bar{\alpha}_{opt}, u), F_{opt}) = \max_{\bar{b},\bar{\beta},\bar{\alpha}} R_{SU\text{-}MIMO}(\bar{b}, \bar{\beta}(\bar{\alpha}, u), F_{opt})$$

Equation (15)

The controller 1235 may include, in the first feedback information, the maximum value of the data transfer rate that can be obtained during application of SU-MIMO to the BS, and configuration information of the beam combination that is mapped to the maximum value. The configuration information may include indicators of a transmit antenna and a transmit beam and indicators of a receive antenna and a receive beam, which constitute the beam combination that is mapped to the maximum value.

If the controller 1235 determines the SU-MIMO scheduling metric and the data transfer rate for all transmit/receive beam combinations, the complexity may be too high. Therefore, in order to reduce the complexity, the controller 1235 may determine the SU-MIMO scheduling metric and the data transfer rate determined based on Equations (14) and (15), only for the transmit/receive beam combinations including, for example, a receive antenna whose received signal power has the maximum value, and include the results thereof in the first feedback information, thereby reducing the complexity.

In conclusion, the first feedback information according to the first embodiment of the present disclosure may include all CQI values for all transmit/receive beam combinations that can be obtained through above-described Equations (6) to (11), or some CQI values satisfying relevant conditions among all the CQI values. In addition, the first feedback information may include the maximum value or its equivalent information of the data transfer rate that can be determined using Equation (15) and can be obtained during application of SU-MIMO, and configuration information and an RI value for the transmit/receive beam combination for each MS, which is mapped to the maximum value. If the digital beamforming is applied, the first feedback information may include an applied precoder value $F_{opt}$, PMI or the like. Herein, CQI or Modulation and Coding Scheme (MCS) may be used as information equivalent to the maximum value of the data transfer rate that can be obtained during application of SU-MIMO.

If the first feedback information is transmitted, the controller 1235 of the apparatus 1200 operating as a BS may perform first DL scheduling based on the first feedback information. In the first DL scheduling process, the controller 1235 may determine the optimal DL MIMO mode that the BS will apply when actually transmitting data.

As a specific example, in the first DL scheduling process, the controller 1235 may compare the maximum value of the SU-MIMO scheduling metric obtained from the first feedback information with the maximum value of the MU-MIMO scheduling metric that is determined according to the scheme described below, and determine the MIMO scheme mapped to the maximum value of them, as the optimal DL MIMO scheme.

For example, in a DL, a BS may transmit a signal 'x' with transmit beams b(a) (a=0, 1, . . . , N−1) of N transmit antennas 'a'. A situation will be considered in which the BS transmits L symbols $s_0, s_1, \ldots, s_{L-1}$ to an MS group (e.g., L MSs u=u$_0$, u$_1$, . . . u$_{L-1}$) to which MU-MIMO will be applied, with the same time and frequency resources. Then, assuming that an MS u=u$_l$ among the MSs receives a signal $y_u$ with receive beams $\beta(\alpha)$ ($\alpha$=0, 1, . . . , M−1) of M receive antennas, and performs reception digital beamforming $w_u$, a received signal may be written as Equation (16) below.

$$y_u = H_u F s + n$$

Equation (16)

$$r_u = w_u y_u + w_u H_u F s + w_u n$$

where $y_u = \begin{bmatrix} y_{u,0} \\ \vdots \\ y_{u,M-1} \end{bmatrix}$, $$H_u = \begin{bmatrix} h_{u,0,0} & \cdots & h_{u,0,N-1} \\ \vdots & \ddots & \vdots \\ h_{u,M-1,0} & \cdots & h_{u,M-1,N-1} \end{bmatrix},$$

$$F = \begin{bmatrix} f_{0,u_0} & \cdots & f_{0,u_{L-1}} \\ \vdots & \ddots & \vdots \\ f_{N-1,u_0} & \cdots & f_{N-1,u_{L-1}} \end{bmatrix}, s = \begin{bmatrix} s_0 \\ \vdots \\ s_{L-1} \end{bmatrix},$$

$$n = \begin{bmatrix} n_0 \\ \vdots \\ n_{M-1} \end{bmatrix}, \text{ and } w_u = [w_{u,0} \cdots w_{u,M-1}].$$

If the reception digital beamforming used by the MS corresponds to a linear filter, the controller 1235 may determine the data transfer rate that the BS and the MS can achieve in the MU-MIMO environment, in accordance with Equation (17) below.

$$R_{MU\text{-}MIMO}\begin{pmatrix} \bar{b}, \bar{\beta}(\bar{\alpha}, u_l), \\ F, w_u | \bar{u} \end{pmatrix} = \log\left\{\frac{1 + (w_u H_u f_u f_u^* H_u^* w_u^*)}{(\sum_{k \neq u} w_u H_u f_k f_k^* H_u^* w_u^* + \gamma^{-1})}\right\}$$

Equation (17)

where $F = [f_{u_n} \cdots f_{u_{L-1}}], f_{u_i} = \begin{bmatrix} f_{0,u_l} \\ \vdots \\ f_{N-1,u_l} \end{bmatrix},$ and $\bar{b}=[b(0) \ldots b(N-1)]$ denotes an indicator of a transmit beam that is used in each of transmit antennas a=0, 1, . . . , N−1 of the BS. In addition, $\bar{\alpha}=[\alpha_0 \ldots \alpha_{M-1}]$ denotes an indicator of a receive antenna of the MS, and indicates an arbitrary change in order of 0, 1, . . . , M−1 corresponding to the indicators of receive antennas. In other words, $\alpha_m \in \{0, 1, \ldots, M-1\}$, m=0, 1, . . . , M−1, and if m≠k as they are unique to each other, $\alpha_m \neq \alpha_k$ may be satisfied. Further, $\bar{u}=[u_0 \ldots u_{L-1}]$ denotes a vector corresponding to an indicator of each of MSs included in the MS group including L MSs that receive the data transmitted by the BS, using the same time and frequency resources, during application of MU-MIMO. Moreover, $\bar{\beta}(\bar{\alpha},u)=[\beta(\alpha_0,u) \ldots \beta(\alpha_{M-1},u)]$ denotes a vector corresponding to an indicator of a receive beam selected at each of M receive antennas of the MS 'u'.

The controller 1235 may determine MU-MIMO scheduling metrics for L MSs constituting an MS group according to the PF scheduling algorithm, using Equation (18) below.

$$P_{MU\text{-}MIMO}(\bar{b}, \bar{\beta}(\bar{\alpha}, u_l), F_{opt}, w_{u,opt} | \bar{u}) = \max_{F,w} \Sigma_{l=0}^{L-1}\{R_{MU\text{-}MIMO}(\bar{b}, \bar{\beta}(\bar{\alpha}, u_l), F, w_u | u) / T(u_l)\}$$

Equation (18)

As illustrated in Equation (18), in order to determine the values of the MU-MIMO scheduling metrics, the controller 1235 should have information about the channel values for the plurality of MSs constituting the MS group to which MU-MIMO is applied. Therefore, the controller 1235 of the apparatus 1200 operating as a BS should obtain CQI values for all transmit/receive beam combinations and the MS group to which MU-MIMO is applied, in order to determine the maximum value of the MU-MIMO scheduling metric for all transmit/receive beam combinations and the MS group to which MU-MIMO is applied, causing a significant reduction in UL data transmission efficiency.

Accordingly, in order to reduce the amount of feedback information required during determination of MU-MIMO scheduling metrics, the present disclosure proposes primary MU-MIMO scheduling metrics approximating the MU-MIMO scheduling metrics determined in accordance with Equation (18). As a specific example, it will be assumed that if the receive power that an MS 'u' has received with a receive beam β of a receive antenna α, for the signal that the BS has transmitted with a transmit beam 'b' of a transmit antenna 'a', is represented as transmit power $p(b(a) \to \beta(\alpha,u))$, $\sigma_n^2$ represents the noise power and $T(u)$ represents average throughput of the MS 'u'. In this case, if the apparatus 1200 operating as a BS simultaneously transmits data to L MSs constituting the MS group, the controller 1235 may determine a primary MU-MIMO scheduling metric $P_{MU\text{-}MIMO\text{-}1}$ determined based on Equation (19).

$$P_{MU\text{-}MIMO\text{-}1}(\bar{b}, \bar{\beta}(\bar{\alpha}, u_l)|u) = \sum_{l=0}^{L-1} \left\{ \log \left(1 + \left( \frac{\Sigma_\alpha p(b(a_l) \to \beta(\alpha, u_l))}{\Sigma_{k \neq l} \Sigma_\alpha p(b(a_k) \to \beta(\alpha, u_l)) + \sigma_n^2} \right) \right) \right\} \quad \text{Equation (19)}$$

where $p(b(\alpha_l) \to \beta(\alpha,u_l))$ denotes the receive power with which an MS $u_l$ has received the signal that the BS has transmitted in a transmit beam $b(\alpha_l)$ a transmit antenna $\alpha_l$, via a receive beam $\beta(\alpha,u_l)$ of a receive antenna α. In addition, $p(b(\alpha_k) \to \beta(\alpha,u_l))$ denotes the receive power with which the MS $u_l$ (where k≠l) has received the signal that the BS has transmitted in a transmit beam $b(\alpha_k)$ of a transmit antenna $\alpha_k$, via a receive beam $\beta(\alpha,u_l)$ of a receive antenna α. The primary MU-MIMO scheduling metric determined based on Equation (19) may be determined using the first feedback information, and may correspond to an approximate value of the MU-MIMO scheduling metric determined based on Equation (18). If there is a transmit beam $\bar{b}$ of the BS, whose $p(b(\alpha_l) \to \beta(\alpha,u_l))$ has the maximum value and $p(b(\alpha_k) \to \beta(\alpha,u_l))$ has the minimum value, for each MS $u_l$ in the MS group $\bar{u}$, a value of the primary MU-MIMO scheduling metric determined based on Equation (19) may have the maximum value. For example, it will be assumed that the BS transmits data to two MSs (e.g., $MS_0$ and $MS_1$) in a DL transmission mode by applying MU-MIMO. Then, the controller 1235 may select a receive beam that satisfies both first and second conditions. For example, if a transmit beam b(0) and a transmit beam b(1) are selected for transmit antennas 0 and 1, the first condition may correspond to a case where the receive power of the signal that $MS_0$ has received via the transmit beam b(0) of the transmit antenna 0 has the maximum value, and the receive power of the signal that $MS_1$ has received via the transmit beam b(0) of the transmit antenna 0 has the minimum value. In the second condition, a receive beam may be selected, which satisfies the conditions in which the receive power of the signal that $MS_1$ has received via the transmit beam b(1) of the transmit antenna 1 has the maximum value, and the receive power of the signal that $MS_0$ has received via the transmit beam b(1) of the transmit antenna 1 has the minimum value. In summary, the controller 1235 may determine the maximum value of the primary MU-MIMO scheduling metric determined based on Equation (19), using the first feedback information. In addition, the controller 1235 may select configuration information (e.g., MS's receive antenna and receive beam, and BS's transmit antenna and transmit beam) of the beam combination that is mapped to the maximum value of the primary MU-MIMO scheduling metric. Thereafter, the controller 1235 may compare the maximum value of the SU-MIMO scheduling metric with the maximum value of the MU-MIMO scheduling metric, which are obtained from the first feedback information. The controller 1235 may determine the MIMO scheme corresponding to the maximum value selected by the comparison results, as an optimal DL MIMO scheme.

In an alternative embodiment, in a case where the apparatus 1200 operates as a BS, if the controller 1235 satisfies the conditions that the maximum value of an SU-MIMO scheduling metric is greater than an MU-MIMO scheduling metric value and a difference between the maximum value of the SU-MIMO scheduling metric and the maximum value of the MU-MIMO scheduling metric value is greater than a predetermined difference reference value T_smd, the controller 1235 may determine the SU-MIMO scheme as an optimal DL MIMO scheme. On the contrary, if the controller 1235 satisfies the conditions that the maximum value of an MU-MIMO scheduling metric is greater than the maximum value of an SU-MIMO scheduling metric and a difference between the maximum value of the MU-MIMO scheduling metric and the maximum value of the SU-MIMO scheduling metric is greater than a predetermined difference reference value T_msd, the controller 1235 determine the MU-MIMO scheme as an optimal DL MU-MIMO scheme. The difference reference values T_smd and T_msd may be set as the same value, or may be set as different values.

Finally, if a difference between the maximum value of the SU-MIMO scheduling metric and the maximum value of the MU-MIMO scheduling metric is not significant as they fall within a predetermined percentage, the controller 1235 may select both of the two schemes as candidate DL MIMO schemes.

If the controller 1235 determines SU-MIMO as a candidate DL MIMO scheme, the controller 1235 may compare the performance improvement due to the application of digital precoding, with a predetermined performance reference value. If the performance improvement is greater than or equal to the performance reference value as a result of the comparison, the controller 1235 may additionally transmit an aperiodic second DL training signal as described in FIG. 4A, for application of digital precoding. Accordingly, the controller 1235 of the apparatus 1200 operating as the BS may perform second scheduling by receiving, from MSs, second feedback information that is generated depending on the second DL training signal. On the other hand, if the performance improvement is less than the performance reference value as a result of the comparison, the controller 1235 may determine not to perform the transmission of the aperiodic second DL training signal. The controller 1235 may transmit actual data to MSs by applying only analog beamforming based on the above-described first DL scheduling.

If the controller 1235 determines both of SU-MIMO and MU-MIMO as candidate DL MIMO schemes, the controller 1235 may transmit an aperiodic second DL training signal to MSs by applying both of SU-MIMO and MU-MIMO. The controller 1235 may receive second feedback information for the second DL training signal for each of SU-MIMO and MU-MIMO, from the MSs, and determine the final DL MIMO scheme by performing second DL scheduling based on the received second feedback information.

Finally, if the controller 1235 determines MU-MIMO as a candidate DL MIMO scheme, the controller 1235 may additionally determine an $SIR_{min}$ value using Equation (20) below.

$$SIR_{min} = \min_l \left( \frac{\Sigma_\alpha p(b(a_l) \to \beta(\alpha, u_l))}{\Sigma_{k \neq l} \Sigma_\alpha p(b(a_k) \to \beta(\alpha, u_l))} \right) \quad \text{Equation (20)}$$

The controller 1235 may compare the $SIR_{min}$ value with a predetermined $SIR_{min}$ threshold. If the $SIR_{min}$ value is less than the predetermined $SIR_{min}$ threshold as a result of the comparison, the controller 1235 may determine that there is significant interference between MSs constituting an MS group to which MU-MIMO is to be applied. Accordingly, the controller 1235 may determine to apply digital beamforming to reduce the interference. Thus, the controller 1235 may additionally transmit an aperiodic second DL training signal to the MSs constituting the MS group, and receive second feedback information from the MSs. Then, the controller 1235 may perform second DL scheduling based on the second feedback information. On the other hand, if the $SIR_{min}$ value is greater than or equal to the $SIR_{min}$ threshold as a result of the comparison, the controller 1235 may determine to transmit data only with the analog beamforming.

In accordance with the first embodiment of the present disclosure, the aperiodic second DL training signal may be transmitted and received just before the BS transmits actual data, in order to minimize the influence of change in channel due to the movement of the MS or the change in environment around the MS. As described above, if the spacing between subcarriers carrying first DL training signals is increased in order to reduce the interference between adjacent cells during transmission of the first DL training signal, a second DL training signal may be transmitted in order to increase the accuracy of the first DL training signal, which may be reduced.

The second feedback information that is generated in the second DL scheduling process that is performed based on the second DL training signal, may include at least one of a size and phase value, a CQI value, an optimal PMI value, an RI value and an MCS value of a multi-beamforming MIMO channel.

In the second DL scheduling process, if the apparatus 1200 operates as a BS, the controller 1235 may determine an optimal DL MIMO scheme satisfying Equation (21) below and a transmit/receive beam combination satisfying the optimal DL MIMO scheme, based on the second feedback information.

$$P = \max_{\bar{b}, \bar{\beta}(\bar{\alpha}, u), \bar{u}} \{ P_{SU\text{-}MIMO}(\bar{b}, \bar{\beta}(\bar{\alpha}, u) F_{opt}), P_{MU\text{-}MIMO}(\bar{b}, \bar{\beta}(\bar{\alpha}, u_l), F_{opt}, w_{u, opt} | \bar{u}) \} \quad \text{(Equation 21)}$$

Next, it will be assumed that the apparatus 1200 operates as an MS or a BS in a UL according to a second embodiment of the present disclosure. Similarly, in this case, the apparatus 1200 operating as a BS or an MS may operate in accordance with the signaling diagrams of FIGS. 5A and 5B.

If the apparatus 1200 operates as an MS, the controller 1235 may transmit a periodic first UL training signal to a BS. On the other hand, if the apparatus 1200 operates as a BS, the controller 1235 may measure CQI values for all transmit/receive beam combinations. In the first UL channel measurement and first UL scheduling process performed based on the periodic first UL training signal, the controller 1235 may determine SU-MIMO scheduling metrics in a UL in accordance with Equation (14).

MU-MIMO technology shows very different characteristics in a DL and a UL. In the DL, a BS may simultaneously transmit a signal to a plurality of MSs using a plurality of antennas. The BS may simultaneously transmit a signal for different MSs for each antenna, and each of a plurality of MSs may detect only its own signal. In this case, each MS may receive even a signal for other MSs, which is unnecessary for the MS itself, causing a decrease in reception performance. Accordingly, the data transfer rate of Equation (17) that the BS and the MS can achieve in the MU-MIMO environment, and the primary MU-MIMO scheduling metrics of Equation (19) may be involved in the above-described performance degradation due to the interference between MSs.

By comparison, in the UL, if a plurality of MSs simultaneously transmit signals to a BS, all the signals transmitted by the plurality of MSs may correspond to the signals which are necessary for the BS, unlike the signals transmitted to the MSs in the DL. Therefore, in the UL, a transmission/reception equation of MU-MIMO may be determined similar to that of SU-MIMO in the DL, and scheduling metrics may be written as Equation (22).

$$P_{MU\text{-}MIMO\text{-}UL}(\bar{b}, \bar{\beta}(\bar{\alpha}, u_l), F | \bar{u}) = \frac{\log \det(I + \gamma H F Q F^* H^*)}{\sum_{l=0}^{L-1} T(u_l)} \quad \text{Equation (22)}$$

$$\text{where } F = \begin{bmatrix} f_{u_0} & 0 & \cdots & 0 \\ 0 & f_{u_1} & \cdots & 0 \\ \vdots & \vdots & \ddots & \vdots \\ 0 & 0 & \cdots & f_{u_{L-1}} \end{bmatrix},$$

ands $f_{u_l}$ denotes a precoding vector for an MS $u_l$.

Therefore, in the UL, the controller 1235 of the apparatus 1200 operating as a BS may determine MU-MIMO scheduling metrics in the UL in accordance with Equation (22). As an example of determining the optimal UL MIMO scheme, the controller 1235 may compare the maximum value of SU-MIMO scheduling metric for the UL with the maximum value of MU-MIMO scheduling metric, and determine a MIMO scheme corresponding to the maximum value of them, as the optimal UL MIMO scheme.

The controller 1235 of the apparatus 1200 operating as a BS may compare the performance improvement due to the application of digital precoding to UL transmission by the MS in the first UL scheduling process, with a predetermined performance reference value. If the performance improvement is greater than or equal to the performance reference value as a result of the comparison, the controller 1235 may determine to additionally transmit an aperiodic second UL training signal as described in FIG. 5A, for application of digital precoding, and may provide indication information thereof to MSs. As described above, if the spacing between subcarriers carrying first UL training signals is increased in order to reduce the interference between adjacent cells during transmission of the first UL training signal, a second UL training signal may be transmitted in order to increase the accuracy of the first UL training signal, which may be reduced.

Thereafter, upon receiving an aperiodic second UL training signal for each MS, the controller 1235 of the apparatus 1200 operating as a BS may perform second UL channel measurement and second UL scheduling based on the aperiodic second UL training signal. In the second UL scheduling process, the controller 1235 may determine the optimal precoder value to be used in UL transmission by the MS, and allocate wireless resources for transmission of UL data.

On the contrary, if the performance improvement is less than the performance reference value as a result of the comparison, the controller 1235 may determine not to apply digital precoding for UL transmission by the MS. However, if a change in UL channel gain for each MS is significant at each frequency after the controller 1235 has determined not to apply digital precoding, the controller 1235 of the apparatus 1200 operating as a BS may ensure gain for multiple users by additionally performing UL sub-band scheduling. In order to perform the UL sub-band scheduling, the controller 1235 may determine to transmit an aperiodic second UL training signal and perform second UL scheduling in the above-described manner.

Finally, it will be assumed that a periodic first UL training signal is not transmitted and received according to the third embodiment of the present disclosure. In this case, the apparatus 1200 operating as a BS or an MS may operate in accordance with the signaling diagram of FIG. 6.

In this case, the controller 1235 of the apparatus 1200 operating as a BS may perform first UL scheduling based on the channel value of a first DL training signal and the optimal MIMO scheme for the DL, which are obtained from the first feedback information for the a periodic first DL training signal. In this case, the scheduling metrics for UL MU-MIMO of Equation (22) may not be determined based on the first feedback information for the periodic first DL training signal. Therefore, in this case, simplified scheduling metrics that use first DL feedback information may be determined in accordance with Equation (23).

$$P_{MU\text{-}MIMO\text{-}1\text{-}UL}(\bar{b},\bar{\beta}(\bar{\alpha},u_l)|u) = \Sigma_{l=0}^{L-1}\{\log\{1+p(b(a_l)\rightarrow\beta(\alpha,u_l))\}/T(u_l)\} \quad \text{Equation (23)}$$

In the first UL scheduling process, the controller 1235 may determine scheduling metrics for UL SU-MIMO using a transfer rate value for DL SU-MIMO, which is included in the first feedback information. As another example of determining an optimal UL MIMO scheme in the first UL scheduling process, the controller 1235 may determine SU-MIMO as an optimal UL MIMO scheme, if the controller 1235 satisfies the conditions that the maximum value of an SU-MIMO scheduling metric is greater than the maximum value of an MU-MIMO scheduling metric for a UL and a difference between the maximum value of the SU-MIMO scheduling metric and the maximum value of the MU-MIMO scheduling metric determined by Equation (23) is greater than a predetermined difference reference value T_smu. On the contrary, the controller 1235 may determine MU-MIMO as an optimal UL MIMO scheme, if the controller 1235 satisfies the conditions that the maximum value of an MU-MIMO scheduling metric is greater than the maximum value of an SU-MIMO scheduling metric for a UL and a difference between the maximum value of the MU-MIMO scheduling metric and the maximum value of the SU-MIMO scheduling metric is greater than a predetermined difference reference value T_msu. The difference reference values T_smu and T_msu may be set as the same value, or may be set as different values.

Finally, if a difference between the maximum value of the SU-MIMO scheduling metric and the maximum value of the MU-MIMO scheduling metric is not significant for the UL as they fall within a predetermined percentage, the controller 1235 may select both of the two schemes as candidate UL MIMO schemes.

In the above-described manner, in the first UL scheduling process, the controller 1235 of the apparatus 1200 operating as a BS may determine at least one candidate combination based on the received signal strength or channel value for the first DL training signals, which is obtained from the first feedback information. The controller 1235 may compare the performance for the at least one candidate combination with a predetermined performance reference value, and select a path to be used to transmit an aperiodic second UL training signal, from among the at least one candidate combinations depending on the comparison results. The controller 1235 may control the apparatus 1200 to transmit indication information including a transmission instruction for the aperiodic second UL training signal and information about a path to be used to transmit the aperiodic second UL training signal, to the MSs included in the path to be used to transmit the aperiodic second UL training signal.

Thereafter, upon detecting reception of the aperiodic second UL training signal, the controller 1235 may perform second UL scheduling based thereon. As the controller 1235 obtains all channel information needed for determination of second UL scheduling in the second UL training process, the controller 1235 may use Equation (22) for determination of scheduling metrics for UL MU-MIMO in the second UL scheduling process. In the second UL scheduling process, the controller 1235 may select a candidate UL MIMO scheme, select the final path to be used to actually transmit UL data, and allocate wireless resources for UL data transmission by MSs included in the final paths. In other words, the controller 1235 may determine a UL MIMO mode and a precoder value, which will be used by the MS included in the selected final path. The controller 1235 may transmit indication information including information about the final path and information about wireless resources allocated for UL data transmission, to the MSs included in the final path.

For reference, a description will now be made of an example of the signal transmission/reception standard in the wireless communication system to which hybrid beamforming is applied according to an embodiment of the present disclosure. First, one radio frame has a length of 5 ms, and may include five subframes each having a fixed length of 1 ms. One subframe may include 20 slots each having a fixed length of 50 µs. One slot may include 10 or 11 OFDM symbols. One OFDM symbol may include an FFT interval and a CP interval. The FFT interval may have a length of 4 µs, the CP interval may have a length of 1 µs or 0.5 µs, and one OFDM symbol may have a length of 5 µs or 4.5 µs. As a result, in this example, a length of one slot may correspond to a length of 10 OFDM symbols each having a length of 5 µs, or a sum of a length of one OFDM symbol having a length of 5 µs and a length of 10 OFDM symbols each having a length of 4.5 µs.

For example, in the communication system employing a frequency division scheme, in a DL, a BS may transmit at least one slot for Synchronization (Sync) or Broadcast Channel (BCH) to MSs in every frame. Upon receiving the slot, at least one MS may match synchronization with the BS and receive system control information through the BCH. In accordance with an embodiment of the present disclosure, the BS may transmit various control information and a second DL training signal over at least one control slot in every subframe. In addition, the BS may transmit a first DL training signal over at least one Beam Measurement (BM) slot at every period selected by the system or at every period defined in the standard. In the DL, the BS may transmit actual data over at least one slot in each subframe. Although the slot (hereinafter referred to as a 'data slot') over which actual data is transmitted may be selected by the system to have 10 or 11 OFDM symbols depending on the channel characteristics, all the other types of slots may include 10 OFDM symbols at all times. Similarly, even in the UL, the above-described slots may exist in each frame.

FIG. 13A illustrates an example of a DL frame structure according to an embodiment of the present disclosure.

Referring to FIG. 13A, for example, a DL frame may include a total of 5 subframes, and one BM slot (BM slot-1, BM slot-2, BM slot-3, or BM slot-4) may be transmitted in every subframe 1 to subframe 4. The number of BM slots arranged in one frame or one subframe may be adjusted depending on the implementation of transmit antennas mounted on a BS and transmit beams for each transmit antenna. In the BM slot, the BS may provide information about the total number, cycle and pattern of BM slots, to an MS through a BCH or an SIB. Since one BM slot includes 10 OFDM symbols, if the periodic first DL training signal according to an embodiment of the present disclosure is transmitted through each symbol, the first DL training signal may be transmitted for a total of 10 transmit beams. Assuming that the BS generates a total of 40 transmit beams through its all transmit antennas, the BS may transmit the first DL training signal for 40 transmit beams through a total of 4 BS slots, by allocating one BM slot in each of the subframe 1 to the subframe 4.

FIG. 13B illustrates an example of a method of switching transmit beams of a BS and receive beams of an MS for transmission/reception of a first DL training signal in a DL frame structure according to an embodiment of the present disclosure.

Referring to FIG. 13B, one DL frame includes 5 subframes. A situation will be considered in which a first DL training signal according to the first embodiment of the present disclosure is transmitted over one BM slot in each subframe. An MS may fix a receive beam for a BM slot in each subframe to, for example, a beam #2. The BS may transmit the first DL training signal while sequentially switching 10 transmit beams for an arbitrary transmit antenna during a BM slot for each subframe. As a specific example, the BS may transmit the first DL training signal while sequentially switching transmit beams #0 to #9 in a BM slot of a subframe 0 of a frame 1, and transmit one OFDM symbol constituting the first DL training signal for each beam being switched. The BS may transmit the first DL training signal while sequentially switching transmit beams #10 to #19 of the transmit antenna in a BM slot of a second subframe of the frame 1. In this manner, the BS may transmit the first DL training signal while sequentially switching transmit beams #40 to #49 of the transmit antenna in a BM slot in the last subframe 4 of the frame 1. In this way, an MS may receive a BM slot with the same fixed receive beam in one frame, but the MS may receive other slots in the same frame with receive beams different from the receive beam used in the BM slot. Even in a frame following the frame 1, transmission of the first DL training signal by the BS over the BM slot may be performed in the same way as in the frame 1. However, an MS may switch a receive beam for receiving a BM slot for each subframe to another beam, for example, a beam #3, and receive the first DL training signal. In this way, the BS may periodically transmit the first DL training signal for all transmit beams of the antenna in every frame and the MS may receive a BM slot by switching receive beams for each frame, so the MS may receive the first DL training signal for all transmit/receive beam combinations, and measure a channel for the received signal. A value of the channel measured based on the first DL training signal may include a wideband CQI value for the received signal depending on the subcarrier and code of the OFDM symbol designated for each cell, antenna and beam. The wideband CQI value may correspond to the long-term channel characteristics that are determined by the macroscopic factors such as the size and location of a reflector around the BS and MS, and the width and direction of transmit/receive beams, and may slowly change even if the MS moves. Therefore, the optimal beam combination, the wideband CQI value of which has the maximum value, may be found as a result of the channel measurement for the periodic first DL training signals for all transmit/receive beam combinations, and the transmit beam and the receive beam configuring the optimal beam combination may be used regardless of the movement of the MS. Since the first DL training signal according to the first to third embodiments of the present disclosure is distinguished depending on the plurality of cell types and antennas that simultaneously transmit training signals, the estimation performance may be increased by distinguishing interference signals coming from the adjacent cells. If the signals from adjacent cells cannot be distinguished, the optimal transmit beam may be misrecognized, causing serious errors in the beam operation of the BS and the MS. In addition, for at least one beam combination selected based on the first DL training signal, the short-term channel values (such as the size and phase value of a channel) for considering the mobility of the MS may also be estimated. In particular, for a candidate beam combination to which SU-MIMO is to be applied, since the scheduling metric and data transfer rate that are based on Equation (14) or (15) should be calculated, the short-term channel values may be estimated.

Thereafter, in the first DL scheduling process performed based on the first DL training signal, if the BS determines to transmit a second DL training signal, the BS may transmit the second DL training signal via the transmit antenna and transmit beam selected in the first DL scheduling process. The second DL training signal may be transmitted through an OFDM symbol in a control slot for each subframe illustrated in FIGS. 13A and 13B. Indication information for the MSs, which are selected as a target to receive the second DL training signal in the first DL scheduling process, may be transmitted through the control slot. The MSs, which have received the indication information over the control slot, may receive the second DL training signal using the receive antenna and receive beam included in the indication information, and estimate a channel value for the received signal. The aperiodic second DL training signal according to an embodiment of the present disclosure may be transmitted just before the BS actually transmit data, in order to consider changes in short-term channel due to the movement of the MS. Therefore, the control slot over which the second DL training signal is transmitted may be transmitted in a slot just before the data slot in every subframe. Thereafter, the BS may perform second DL scheduling and determine a precoder value, based on the second feedback information including the channel estimation results for the second DL training signal for each MS, and then transmit the data slot, to which digital beamforming is applied with the determined precoder value. For example, the time required for transmission and channel estimation for the second DL training signal and the feedback and digital beamforming may be minimized to one subframe (e.g., 1 ms).

Figure 14A:
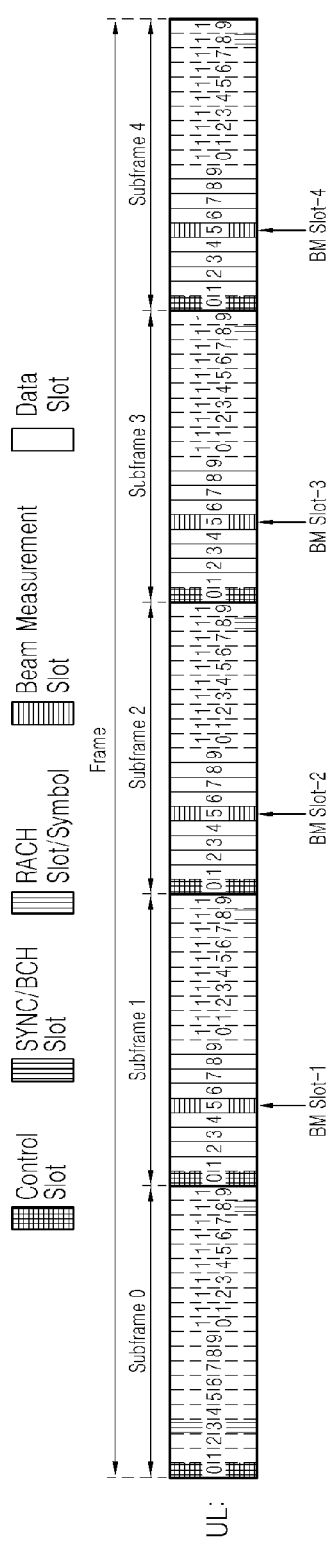
FIG. 14A illustrates an example of a UL frame structure according to an embodiment of the present disclosure.

FIG. 14A illustrates an example of a UL frame structure according to an embodiment of the present disclosure.

Referring to FIG. 14A, one frame may include a total of 5 subframes, and one BM slot (BM slot-1, BM slot-2, BM slot-3, or BM slot-4) may be transmitted in every subframe 1 to subframe 4. The number of BM slots arranged in one frame or one subframe may be adjusted depending on the implementation of receive antennas mounted on a BS and receive beams for each receive antenna.

Figure 14B:
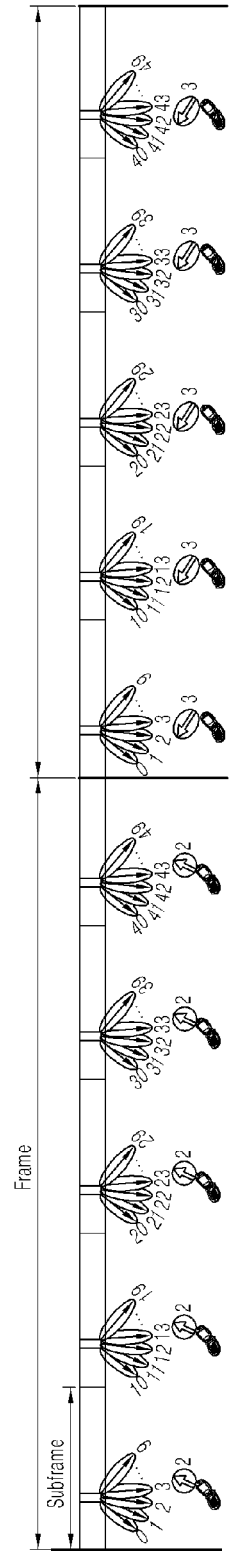
FIG. 14B illustrates an example of a method of switching receive beams of a BS and transmit beams of an MS for transmission/reception of a first UL training signal in a UL frame structure according to an embodiment of the present disclosure.

FIG. 14B illustrates an example of a method of switching receive beams of a BS and transmit beams of an MS for transmission/reception of a first UL training signal in a UL frame structure according to an embodiment of the present disclosure.

Referring to FIG. 14B, one UL frame includes 5 subframes. A situation will be considered in which a first UL training signal according to the second embodiment of the present disclosure is transmitted over one BM slot in each subframe. An MS may fix a transmit beam for a BM slot in each subframe to, for example, a beam #2, and repeatedly transmit the first UL training signal as many times as the total number of receive beams of the receive antenna of the BS. The BS may receive the first UL training signal while sequentially switching 10 receive beams for an arbitrary receive antenna during a BM slot for each subframe. The BS may receive one OFDM symbol constituting the first UL training signal for each receive beam being switched. The BS may receive the first UL training signal while sequentially switching receive beams #10 to #19 of the receive antenna in a BM slot of a second subframe of the frame 1. In this manner, the BS may receive the first UL training signal while sequentially switching receive beams #40 to #49 of the receive antenna in a BM slot in the last subframe 4 of the frame 1. In this way, an MS may transmit a BM slot with the same fixed transmit beam in one frame, but the MS may transmit other slots in the same frame with transmit beams different from the transmit beam used in the BM slot. Even in a frame following the frame 1, reception of the first UL training signal by the BS over the BM slot may be performed in the same way as in the frame 1. However, an MS may switch a transmit beam for transmitting a BM slot for each subframe to another beam, for example, a beam #3, and transmit the first UL training signal. In this way, the BS may periodically receive the first UL training signal for all receive beams of the antenna in every frame, and the MS may transmit a BM slot by switching transmit beams for each frame, so the BS may receive the first UL training signal for all transmit/receive beam combinations of the MS, and measure a channel for the received signal. A value of the channel measured based on the first UL training signal may include a wideband CQI value for the received signal depending on the subcarrier and code of the OFDM symbol designated for each cell, antenna and beam. The wideband CQI value may have the same characteristics as those measured in the DL frame structure, so a redundant description thereof will be omitted herein. The first UL training signal according to the second embodiment of the present disclosure may also have the same characteristics as those of the first DL training signal according to the first embodiment, so the short-term channel values may be estimated.

If the first UL training is completed for all transmit/receive beam combinations of one MS, the BS may select another MS and perform first UL training for the selected MS, and may perform first UL training for all MSs in its cell if necessary. In this case, in order to complete the first UL training for all MSs in the cell, quite a long time may be required. Therefore, the first DL training results may be utilized in order to efficiently perform first UL training while reducing the required time. For example, if first UL training is performed only for the MSs whose optimal transmit/receive beam combination is changed through the first DL training, the number of MSs to be subject to first UL training may be reduced, and the first UL training time for the entire cell may be reduced. If transmit beams and receive beams have almost same beam width and direction in all MSs, first UL training may be performed only for the transmit beams whose beam width and direction are almost the same as those of the optimal receive beams of the MS through the first DL training, making it possible to additionally reduce the training time. In addition, if its transmit beams and receive beams have the same beam width and direction, the BS may also perform first UL scheduling based on the first DL training results, omitting first UL training as in FIG. 6.

Thereafter, if the BS determines to transmit the aperiodic second UL training signal in the first UL scheduling process performed based on the first UL training signal, the BS may transmit indication information for the target MSs that will transmit the second UL training signal, to the MS over the control slot in each subframe. Upon receiving the indication information over the control slot in each subframe, MSs may transmit the second UL training signal via the transmit antenna and transmit beam indicated by the indication information. The second UL training signal may be transmitted through an OFDM symbol in a control slot of each subframe illustrated in FIGS. 14A and 14B. The aperiodic second UL training signal may be transmitted just before the MS actually transmits data, in order to consider changes in short-term channel due to the movement of the MS. Therefore, the control slot over which the second UL training signal is transmitted may be transmitted in a slot just before the data slot in every subframe. Thereafter, the BS may perform second UL scheduling, based on the results of channel estimation performed for the second UL training signal. In the second UL scheduling process, the BS may determine a precoder value to be used by the MS, and provide indication information indicating the determined precoder value to the MS over the control slot in each subframe. Then, the MS may transmit the data to the BS over the data slot in each subframe using the precoder value. Even in the UL frame structure, for example, the time required for transmission and channel estimation for the second UL training signal and the feedback and digital beamforming process may be minimized to one subframe (e.g., 1 ms).

If digital beamforming is determined not to be performed, based on the channel measurement results for the second UL/DL training signal, the transmission and channel estimation for the second UL/DL training signal and the feedback and digital beamforming may not be performed, and the data slot may be transmitted and received using only the analog beamforming.

Figure 15:
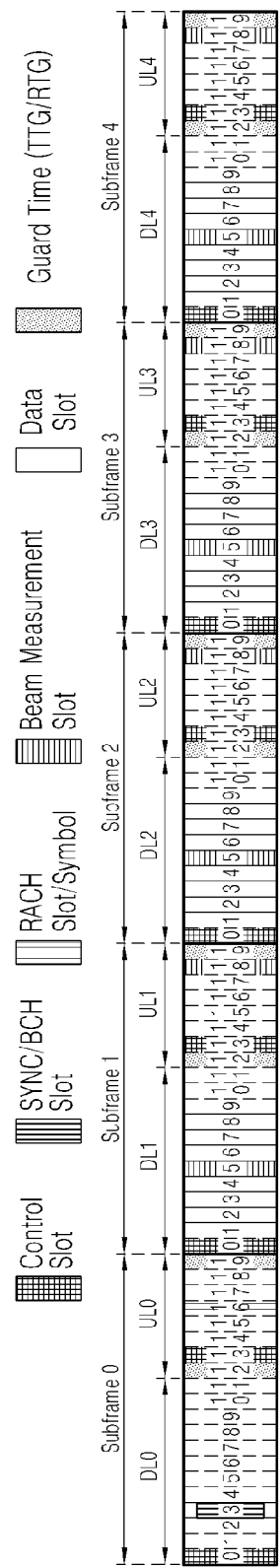
FIG. 15 illustrates an example of a case in which a Time Division Duplexing (TDD) scheme is applied in a frame structure according to an embodiment of the present disclosure.

FIG. 15 illustrates an example of a case in which a Time Division Duplex (TDD) scheme is applied in a frame structure according to an embodiment of the present disclosure.

Referring to FIG. 15, a frame, to which a TDD scheme is applied, may also include subframes and slots having the same time length and function as those of the frames, to which a Frequency Division Duplex (FDD) scheme is applied, in FIGS. 13A to 13B.

The time period of each subframe may represent an example of DL slots and UL slots allocated to distinguish a DL time period and a UL time period. The operation method and principle of the present disclosure in the TDD scheme may be the same as those in the FDD scheme, so a redundant description thereof will be omitted.

Reference will now be made to FIGS. 16A to 18B, to describe operations of a BS and an MS according to embodiments of the present disclosure. Operations of the BS and the MS, which are performed according each embodiment, are the same as the operations in each process in FIGS. 4A to 6, and the operations in FIG. 12, so a redundant description thereof will be omitted herein.

Figure 16A:
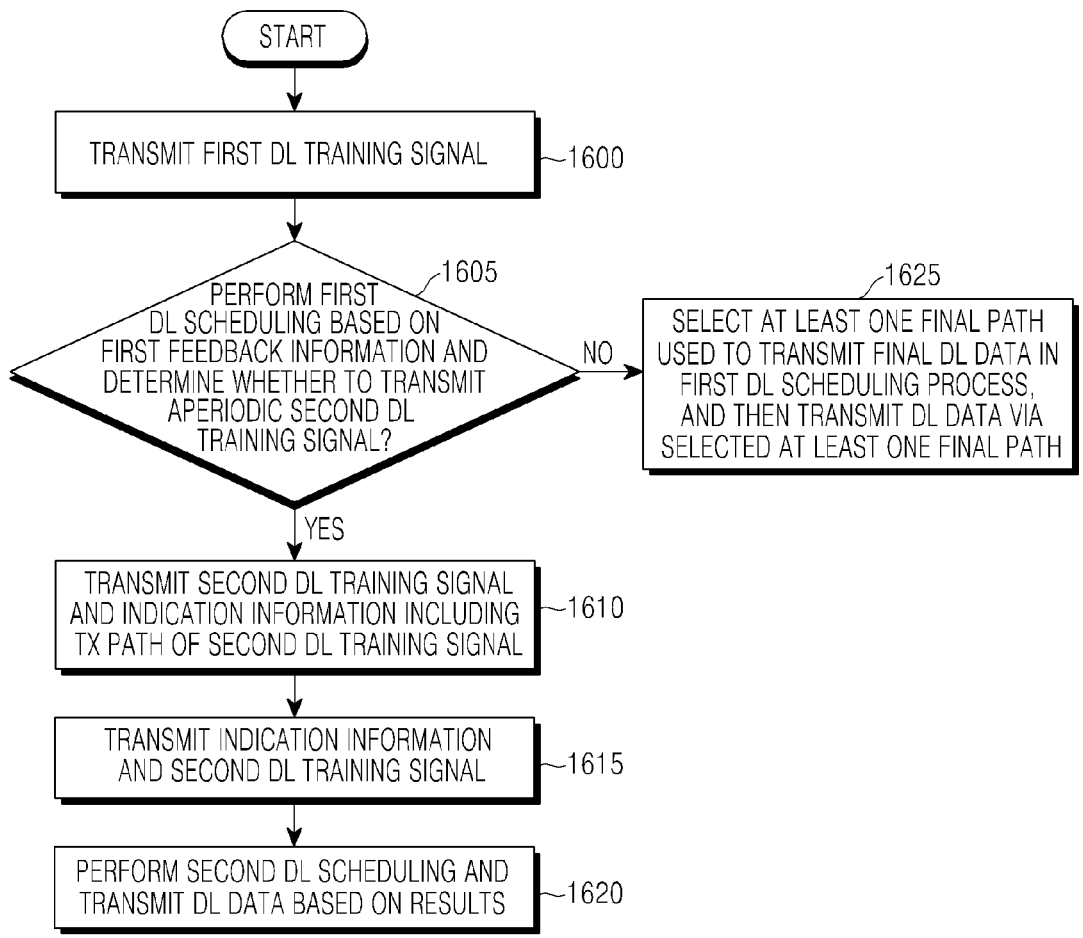
FIG. 16A is a flowchart illustrating an operation of a BS according to the first embodiment of the present disclosure.

FIG. 16A is a flowchart illustrating an operation of a BS according to the first embodiment of the present disclosure.

Referring to FIG. 16A, in operation 1600, the BS may transmit a first DL training signal at a predetermined cycle. The first DL training signal may be transmitted for all transmit/receive beam combinations as described in operations 404a to 404b in FIG. 4A. In operation 1605, the BS may receive first feedback information including the channel measurement results for the first DL training signal. The information included in the first feedback information has been described in FIGS. 4A to 12, so a redundant description thereof will be omitted herein. The BS may perform first DL scheduling based on the first feedback information. The first DL scheduling process may be performed in the same way as in operation 410 in FIG. 4A. In the first DL scheduling process, the BS may determine whether to transmit an aperiodic second DL training signal.

If the BS determines to transmit the second DL training signal, the BS may provide indication information including a transmission path of the second DL training signal in operation 1610, and transmit the second DL training signal to the MSs included in the indication information, in operation 1615.

Upon receiving second feedback information for the second DL training signal from the MSs, the BS may, in operation 1620, perform second DL scheduling based on the second feedback information, select at least one final path to be used to finally transmit DL data to the candidate MSs from which the second feedback information is received, and allocate resources for transmission of the DL data. The BS may transmit DL data to the MS that is included in the at least one final path according to the second DL scheduling results, using the allocated resources.

If the BS determines not to transmit the aperiodic second DL training signal, the BS, in operation 1625, may select at least one final path to be used to finally transmit DL data to the candidate MSs from which the first feedback information is received, and allocate resources for transmission of the DL data, in the first DL scheduling process. Similarly, the BS may transmit DL data along the final path.

Figure 16B:
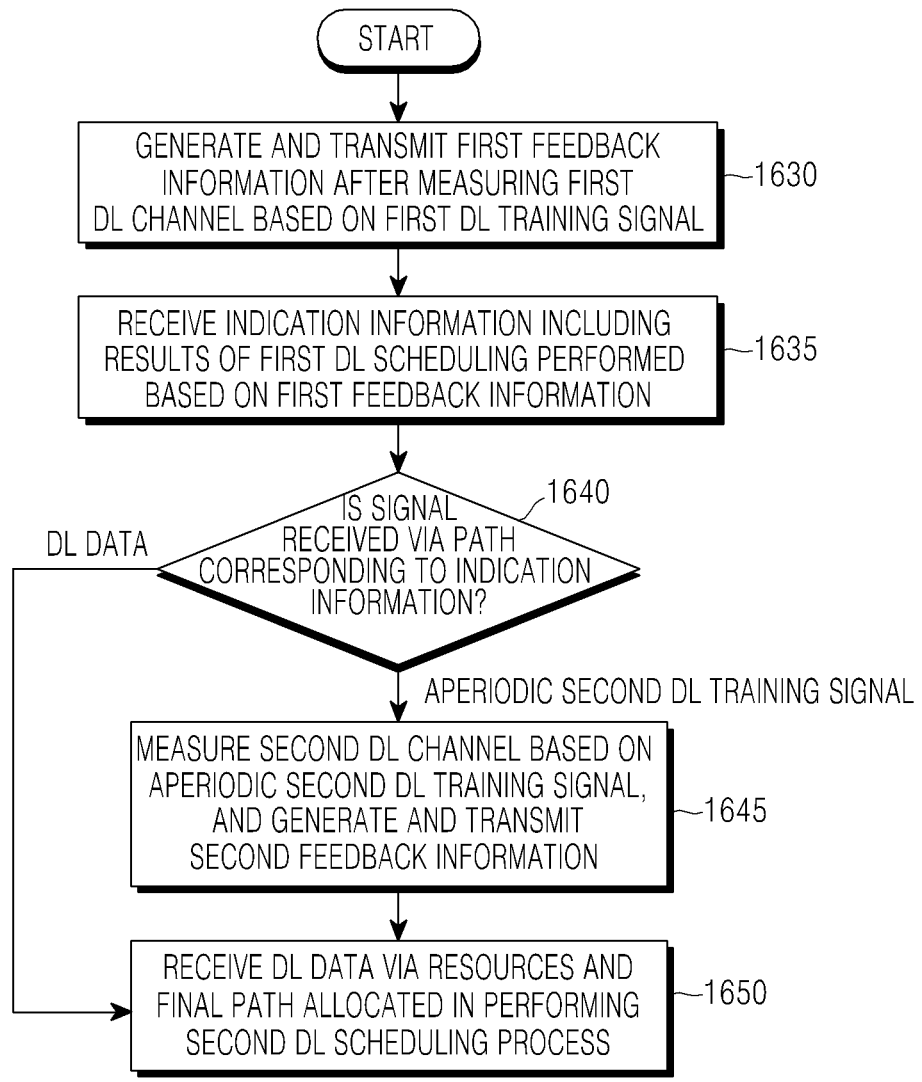
FIG. 16B is a flowchart illustrating an operation of an MS according to the first embodiment of the present disclosure.

FIG. 16B is a flowchart illustrating an operation of an MS according to the first embodiment of the present disclosure.

Referring to FIG. 16B, in operation 1630, the MS may receive a first DL training signal that is periodically transmitted from a BS, and may perform first DL channel measurement for the first DL training signal, generate first feedback information based on the measurement results, and transmit the first feedback information to the BS. The measurement of the first DL channel and the generation of the first feedback information may correspond to operations 406 to 408a in FIG. 4A.

In operation 1635, the MS may receive, from the BS, indication information including the results of the first DL scheduling that is performed based on the first feedback information. The reception of the indication information may also correspond to operation 412 in FIG. 4A.

Thereafter, in operation 1640, the MS may determine the signal that is received via the path corresponding to the indication information.

If the signal is determined as DL data, the MS may proceed to operation 1650.

On the other hand, if the signal is determined as an aperiodic second DL training signal, the MS, in operation 1645, may measure the second DL channel based on the aperiodic second DL training signal, generate second feedback information based on the measurement results, and transmit the second feedback information to the BS. Operation 1645 may also correspond to operations 416 to 418 in FIG. 4A.

Thereafter, in operation 1650, the MS may receive the DL data that is received through the final path and resources allocated in the second DL scheduling process that is performed based on the second feedback information. The second DL scheduling process may correspond to operation 420 in FIG. 4A.

Figure 17A:
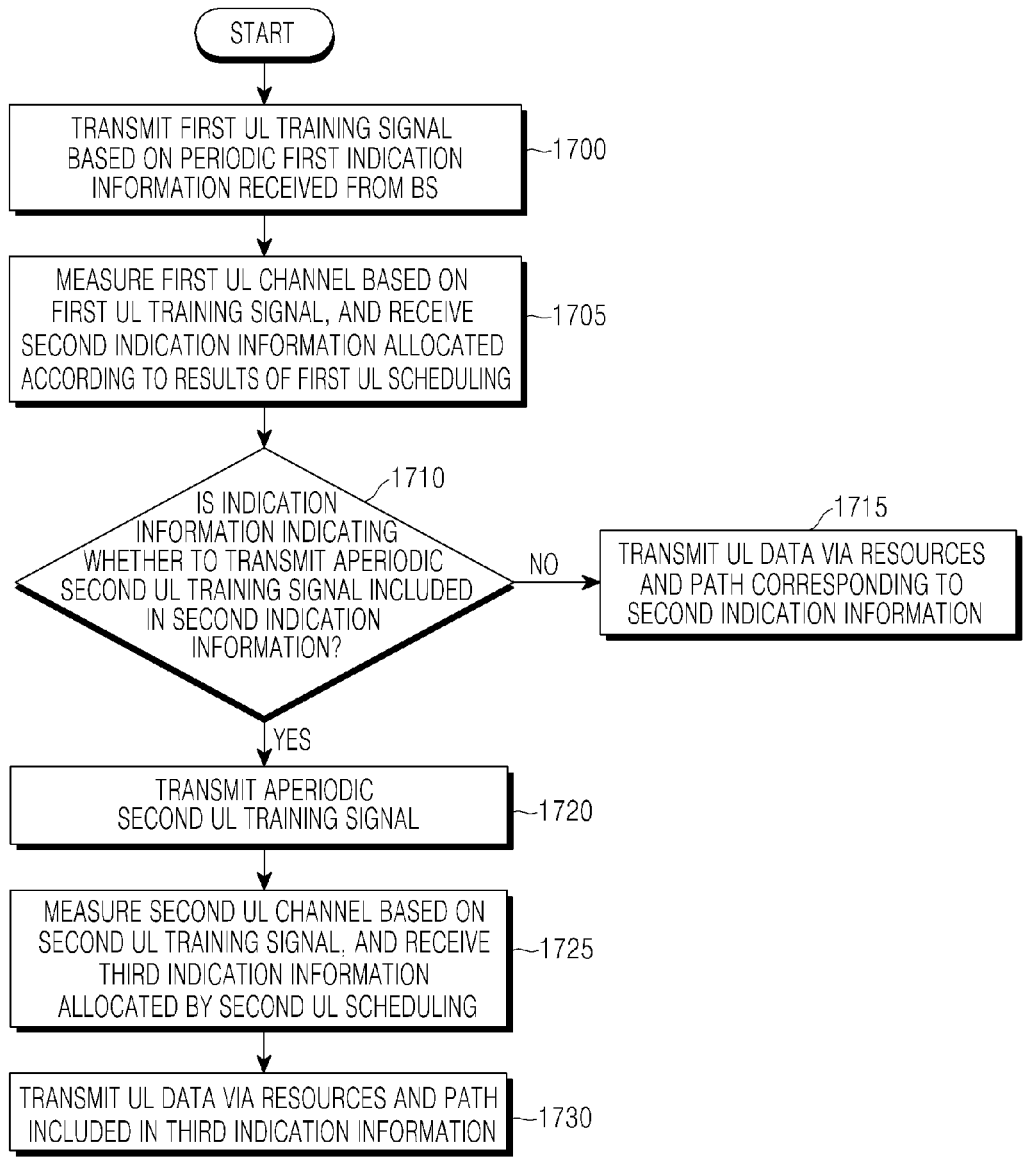
FIG. 17A is a flowchart illustrating an operation of an MS according to the second embodiment of the present disclosure.

FIG. 17A is a flowchart illustrating an operation of an MS according to the second embodiment of the present disclosure.

Referring to FIG. 17A, in operation 1700, the MS may transmit a first UL training signal based on the first indication information that is periodically received from a BS. The reception of the first indication information may correspond to operation 503 in FIG. 5A.

In operation 1705, the MS may receive, from the BS, second indication information that is allocated depending on the results of the first UL channel measurement performed based on the first UL training signal by the BS and the results of the first UL scheduling performed based on the first UL channel measurement. The first UL channel measurement, the first UL scheduling, and the reception of the second indication information may correspond to operations 506 to 510 in FIG. 5A.

In operation 1710, the MS may determine whether the second indication information includes information indicating whether to transmit the aperiodic second UL training signal.

If it is determined that there is no information indicating transmission of the aperiodic second UL training signal, the MS may transmit the UL data to the BS via the resources and path corresponding to the second indication information in operation 1715. Operation 1715 may correspond to operations 522 to 524 in FIG. 5B.

If it is determined that the second indication information includes information indicating transmission of the aperiodic second UL training signal, the MS may transmit the aperiodic second UL training signal to the BS via the resources and path corresponding to the second indication information in operation 1720. Thereafter, in operation 1725, the MS may receive third indication information that is allocated by second UL scheduling performed depending on the results of the second UL channel measurement performed based on the second UL training signal. The second UL channel measurement, the second UL scheduling and the reception of the third indication information may correspond to operations 514 to 518 in FIG. 5A.

Thereafter, in operation 1730, the MS may transmit UL data to the BS through the resources and path included in the third indication information.

Figure 17B:
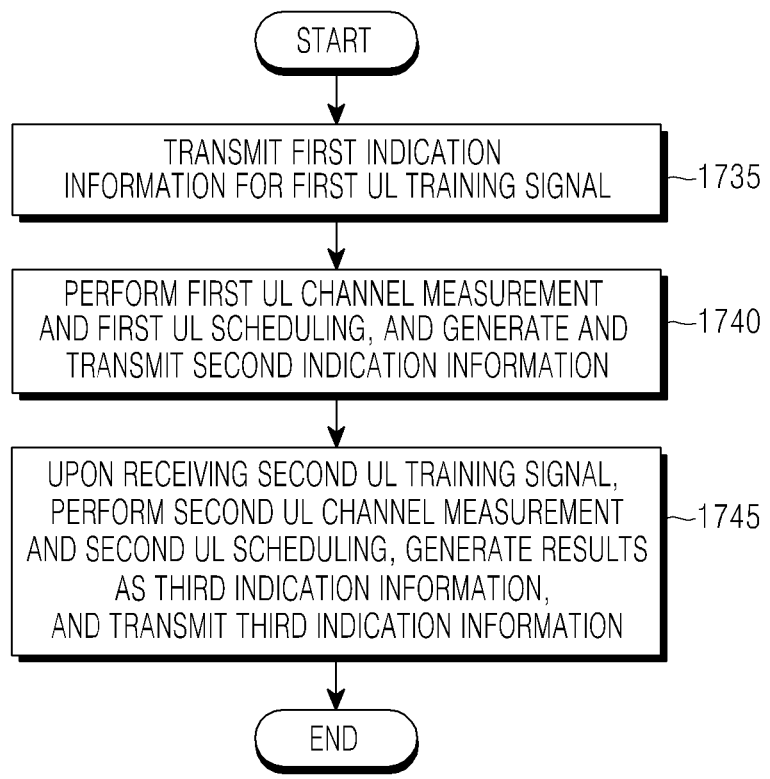
FIG. 17B is a flowchart illustrating an operation of a BS according to the second embodiment of the present disclosure.

FIG. 17B is a flowchart illustrating an operation of a BS according to the second embodiment of the present disclosure.

Referring to FIG. 17B, in operation 1735, the BS may transmit first indication information including the resources, path and cycle for transmission of a first UL training signal by an MS. The transmission of the first indication information may correspond to operation 503 in FIG. 5A.

In operation 1740, upon receiving the first UL training signal from the MS, the BS may perform first UL channel measurement and first UL scheduling based on the received first UL training signal. The BS may determine whether to permit transmission of an aperiodic second UL training signal, and include or insert information indicating the determination results in the second indication information. The BS may transmit the second indication information to the MSs included in the target path for transmission of the second UL training signal. The first UL channel measurement, the first UL scheduling, and the determining whether to permit transmission of the second UL training signal may correspond to operations 506 to 508 in FIG. 5A.

After determining whether to permit transmission of the aperiodic second UL training signal, upon receiving the second UL training signal from the MSs, the BS may perform second UL channel measurement and second UL scheduling for the received second UL training signal, and generate third indication information based on the results thereof, in operation 1745. The second UL channel measurement and the second UL scheduling may correspond to operations 415 to 516 in FIG. 5A. The BS may transmit the third indication information to the MSs included in the final path that is included in the third indication information and is used to transmit UL data.

Figure 18A:
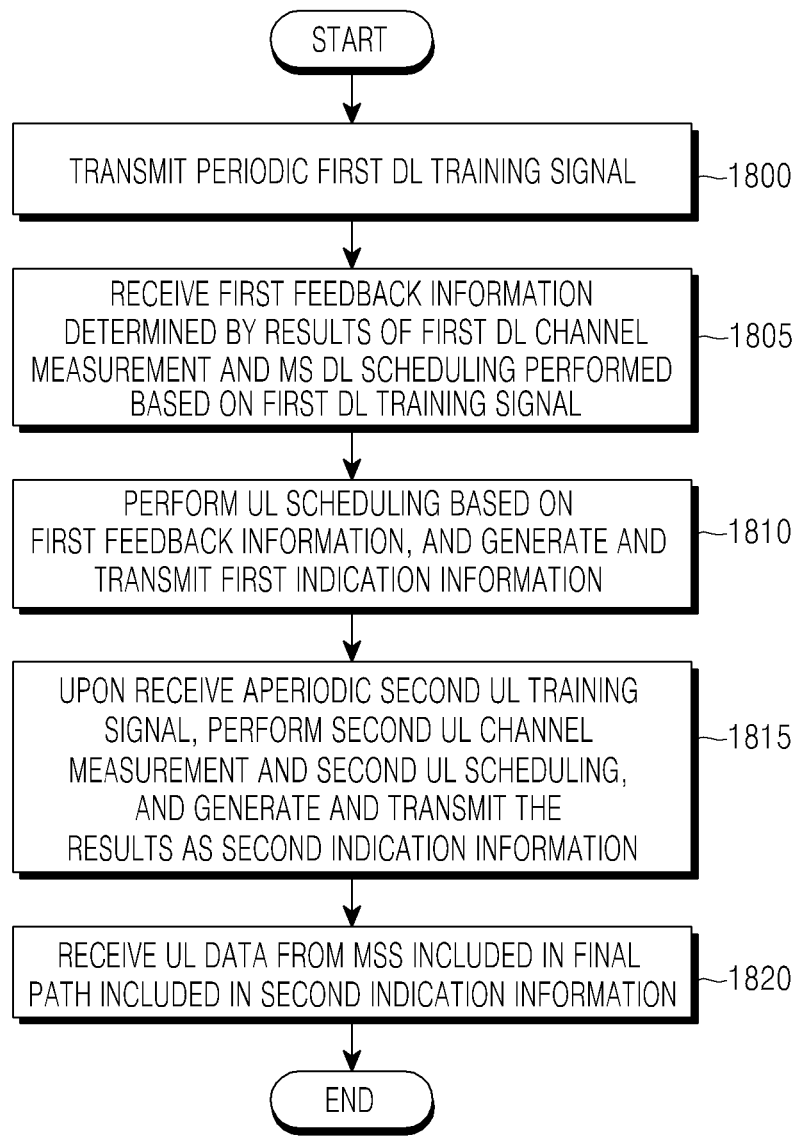
FIG. 18A is a flowchart illustrating an operation of a BS according to the third embodiment of the present disclosure.

FIG. 18A is a flowchart illustrating an operation of a BS according to the third embodiment of the present disclosure.

Referring to FIG. 18A, in operation 1800, the BS may transmit a periodic first DL training signal. In this case, like in the first embodiment, the first DL training signal may be transmitted for all transmit/receive beam combinations.

In operation 1805, the BS may receive first feedback information determined depending on the results of first DL channel measurement and MS DL scheduling, which are performed based on the first DL training signal. The first DL channel measurement, the MS DL scheduling and the reception of the first feedback information may correspond to operations 606 to 610 in FIG. 6.

Thereafter, in operation 1810, the BS may determine whether to permit transmission of an aperiodic second UL training signal by the MSs, by performing first UL scheduling based on the first feedback information, and transmit first indication information including indication information for determination results to the MSs. The first UL scheduling and the transmission of the first indication information may correspond to operations 612 to 614 in FIG. 6.

Thereafter, in operation 1815, upon receiving the aperiodic second UL training signal from the MSs included in the paths corresponding to the first indication information, the BS may perform second UL channel measurement and second UL scheduling, generate second indication information based on the results thereof, and transmit the second indication information to the MSs included in the final path. The final path represents a path to be used to transmit UL data. The second UL channel measurement, the second UL scheduling, and the transmission of the second indication information may correspond to operations 618 to 622 in FIG. 6.

Thereafter, in operation 1820, the BS may receive UL data from the MSs included in the final path.

Figure 18B:
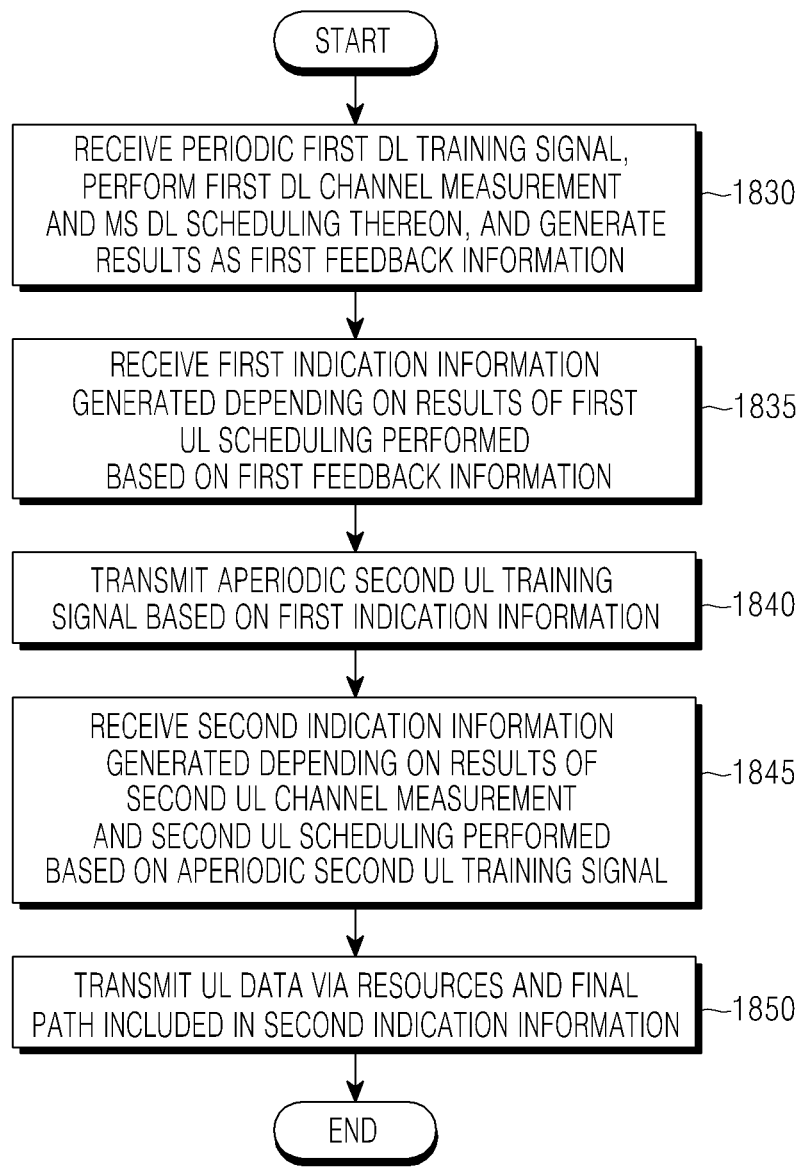
FIG. 18B is a flowchart illustrating an operation of an MS according to the third embodiment of the present disclosure.

FIG. 18B is a flowchart illustrating an operation of an MS according to the third embodiment of the present disclosure.

Referring to FIG. 18B, in operation 1830, upon receiving a first DL training signal that is periodically received from a BS, the MS may perform first DL channel measurement and MS DL scheduling for the received first DL training signal, generate first feedback information based on the results thereof, and transmit the first feedback information to the BS. The first DL channel measurement, the MS DL scheduling and the transmission of the first feedback information may correspond to operations 606 to 610 in FIG. 6.

In operation 1835, the MS may receive, from the BS, first indication information that is generated depending on the results of first UL scheduling performed based on the first feedback information.

In operation 1840, the MS may transmit an aperiodic second UL training signal based on the first feedback information. Thereafter, in operation 1845, the MS may receive second indication information that is generated depending on the results of second UL channel measurement and second UL scheduling, which are performed based on the aperiodic second UL training signal. In operation 1850, the MS may transmit UL data via the resources and final path included in the second indication information.

As is apparent from the foregoing description, the present disclosure may provide a detailed procedure for transmission/reception and feedback of training signals, which is included in the scheduling process for selecting an optimal beam combination for application of analog beamforming, thereby to reduce the resources and delay time required in the scheduling process, contributing to the minimization of the scheduling complexity and the maximization of the communication efficiency. In addition, the scheduling process of the present disclosure may include a process of determining whether to additionally apply digital precoding, based on the results of channel measurement due to the mobility of the MS, thereby contributing to the maximization of the communication efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for beamforming by a base station (BS) in a communication system, the method comprising:
    determining whether to transmit an aperiodic second training signal, using first feedback information for a first training signal that is periodically transmitted, the first feedback information being received from at least one mobile station (MS);
    performing scheduling on downlink (DL) data using the first feedback information or second feedback information of the aperiodic second training signal based on a result of the determining; and
    transmitting the DL data to an MS determined by the scheduling.

2. The method of claim 1, wherein the determining of whether to transmit the second training signal comprises:
    determining, based on the first feedback information, a multi-input multi-output (MIMO) mode to be used during transmission of the DL data, and at least one candidate path to which the MIMO mode is to be applied; and
    determining to transmit the second training signal, if a condition is satisfied in which, if the MIMO mode is applied to the at least one candidate path, an expected performance is less than a predetermined performance reference.

3. The method of claim 2, further comprising:
    transmitting indication information including the MIMO mode and configuration information for the at least one candidate path, and the second training signal via the at least one candidate path,
    wherein the configuration information for the candidate path includes indication information of a transmit antenna and a transmit beam of the BS that transmits the second training signal, and indication information of a receive antenna and a receive beam of each of the MSs included in the candidate path.

4. The method of claim 1,
wherein upon determining to transmit the second training signal, transmitting the second training signal to MSs selected using the first feedback information, and
wherein the second training signal is transmitted before the transmission of the DL data.

5. The method of claim 1, wherein the first feedback information includes at least one of at least one candidate path in which a channel value for the first training signals exceeds a preset threshold or has a maximum value, a channel value or received power information of the candidate path, transfer rate-related information determined when a single-user multi-input multi-output (SU-MIMO) mode is applied to the at least one candidate path, or a precoder value to be used in the SU-MIMO mode.

6. The method of claim 1, further comprising:
upon determining not to transmit the second training signal, allocating resources and at least one final path for transmission of the DL data using the first feedback information; and
transmitting the DL data via the at least one final path using the resources.

7. The method of claim 1, further comprising:
determining whether to transmit an aperiodic third training signal for an uplink (UL) using the first feedback information;
upon determining to transmit the third training signal for the UL, transmitting indication information for a MIMO mode that is determined using the first feedback information and is to be used during transmission of UL data, and for at least one candidate path to which the MIMO mode is to be applied, to MSs included in the at least one candidate path; and
upon receiving the aperiodic third training signal via MSs included in the at least one candidate path, allocating resources and at least one final path for transmission of the UL data based on the results of channel measurement for the second training signal.

8. The method of claim 1, further comprising:
upon determining to transmit the second training signal, transmitting indication information for at least one candidate path selected based on a channel measurement value included in the first feedback information, to MSs included in the at least one candidate path; and
upon receiving the aperiodic second training signal from the MSs, allocating resources and a final path to be used to transmit uplink (UL) data based on a channel measurement value for the second training signal included in the second feedback information.

9. The method of claim 8, wherein the at least one candidate path or the final path includes information about the BS's receive antenna and receive beam, and the MS's transmit antenna and transmit beam, which are mapped to the path.

10. A method for beamforming by a mobile station (MS) in a communication system, the method comprising:
after transmitting, to a base station (BS), first feedback information about channel measurement of a first training signal that is periodically transmitted from the BS, waiting for reception of a second training signal that is aperiodically transmitted via a receive antenna and a receive beam corresponding to first indication information generated based on the first feedback information; and
receiving, from the BS, downlink (DL) data scheduled using the first feedback information or second feedback information of the second training signal based on a result of determining whether to transmit an aperiodic second training signal, using the first feedback information.

11. The method of claim 10,
wherein the receiving of the DL data further comprises after transmitting second feedback information about channel measurement of the second training signal to the BS, receiving second indication information including a final path for the data, which is scheduled based on the second feedback information, and
wherein the second training signal is received before the transmission of the DL data.

12. The method of claim 10, wherein the receiving of the DL data further comprises, upon determining not to transmit the second training signal by the BS, receiving the DL data via a receive antenna and a receive beam corresponding to each of at least one candidate path corresponding to the first indication information.

13. The method of claim 10, further comprising:
after periodically transmitting a third training signal, receiving, from the BS, third indication information for at least one candidate path selected based on a channel measurement value for the third training signal;
transmitting an aperiodic fourth training signal with the BS's receive antenna and a receive beam via a transmit beam of a transmit antenna corresponding to the third indication information; and
after receiving, from the BS, a fourth indication information for resources and a final path allocated based on a channel measurement value of the fourth training signal, transmitting uplink (UL) data via the final path.

14. The method of claim 13, wherein the fourth training signal is transmitted before the reception of the UL data.

15. A base station (BS) for beamforming in a communication system, the BS comprising:
a receiver configured to receive first feedback information for a first training signal that is periodically transmitted from at least one mobile station (MS);
a controller configured to:
determine whether to transmit an aperiodic second training signal, using the first feedback information, and
perform scheduling on downlink (DL) data using the first feedback information or second feedback information of the aperiodic second training signal based on a result of the determining; and
a transmitter configured to transmit the DL data to an MS determined by the scheduling.

16. The BS of claim 15, wherein the controller is further configured to:
determine, based on the first feedback information, a multi-input multi-output (MIMO) mode to be used during transmission of the DL data, and at least one candidate path to which the MIMO mode is to be applied; and
determine to transmit the second training signal if a condition is satisfied in which, if the MIMO mode is applied to the at least one candidate path, an expected performance is less than a predetermined performance reference.

17. The BS of claim 16,
wherein the transmitter is further configured to, under control of the controller, transmit indication information including the MIMO mode and configuration information for the at least one candidate path, and the second training signal to MSs included in the at least one candidate path, and
wherein the configuration information for the candidate path includes indication information of a transmit antenna and a transmit beam of the BS that transmits the second training signal, and indication information of a receive antenna and a receive beam of each of the MSs included in the candidate path.

18. The BS of claim 17,
wherein upon determining to transmit the second training signal, the transmitter if further configured to transmit the second training signal to MSs selected using the first feedback information, and
wherein the second training signal is transmitted before the transmission of the DL data.

19. The BS of claim 15, wherein the first feedback information includes at least one of at least one candidate path in which a channel value for the first training signals exceeds a preset threshold or has a maximum value, a channel value or received power information of the candidate path, transfer rate-related information determined when a single-user multi-input multi-output (SU-MIMO) mode is applied to the at least one candidate path, or a precoder value to be used in the SU-MIMO mode.

20. The BS of claim 15, wherein the controller is further configured to:
upon determining not to transmit the second training signal, allocate resources and at least one final path for transmission of the DL data using the first feedback information; and
control the transmitter to transmit the DL data via the at least one final path using the resources.

21. The BS of claim 15, wherein the controller is further configured to:
determine whether to transmit an aperiodic third training signal for an uplink (UL) using the first feedback information;
upon determining to transmit the third training signal for the UL, control the transmitter to transmit indication information for a MIMO mode that is determined using the first feedback information and is to be used during transmission of UL data, and for at least one candidate path to which the MIMO mode is to be applied, to MSs included in the at least one candidate path; and
upon receiving the aperiodic third training signal via MSs included in the at least one candidate path, allocate resources and at least one final path for transmission of the UL data based on the results of channel measurement for the second training signal.

22. The BS of claim 15,
wherein, upon determining to transmit the second training signal, the controller is further configured to control the transmitter to transmit indication information for at least one candidate path selected based on a channel measurement value included in the first feedback information, to MSs included in the at least one candidate path, and
wherein, upon receiving the aperiodic second training signal from the MSs, the controller is further configured to allocate resources and a final path to be used to transmit uplink (UL) data based on a channel measurement value for the second training signal included in the second feedback information.

23. The BS of claim 22, wherein the at least one candidate path or the final path includes information about the BS's receive antenna and receive beam, and the MS's transmit antenna and transmit beam, which are mapped to the path.

24. A mobile station (MS) for beamforming in a communication system, the MS comprising:
a controller configured to control:
a transmitter to:
transmit, to a base station (BS), first feedback information about channel measurement of a first training signal that is periodically transmitted from the BS, and
wait for reception of a second training signal that is aperiodically transmitted via a receive antenna and a receive beam corresponding to first indication information generated based on the first feedback information; and
a receiver to:
receive, after the transmitter transmits the second feedback information about channel measurement of the second training signal to the BS, second indication information including a final path for downlink (DL) data, which is scheduled based on the second feedback information, and
receive, from the BS, DL data scheduled using the first feedback information or second feedback information of the second training signal based on a result of determining whether to transmit an aperiodic second training signal, using the first feedback information.

25. The MS of claim 24,
wherein after transmitting second feedback information about channel measurement of the second training signal to the BS, the receiver is further configured to receive second indication information including a final path for the data, which is scheduled based on the second feedback information, and
wherein the second training signal is received before the transmission of the DL data.

26. The MS of claim 24, wherein upon determining not to transmit the second training signal by the BS, the receiver is further configured to receive the DL data via a receive antenna and a receive beam corresponding to the first indication information.

27. The MS of claim 24,
wherein the receiver is further configured to, after the transmitter periodically transmits a third training signal, receive, from the BS, third indication information for at least one candidate path selected based on a channel measurement value for the first training signal,
wherein the transmitter is further configured to transmit an aperiodic fourth training signal with the BS's receive antenna and a receive beam via a transmit beam of a transmit antenna corresponding to the third indication information; and
wherein the controller is further configured to control the transmitter to, after the receiver receives from the BS a fourth indication information for resources and a final path allocated based on a channel measurement value of the fourth training signal, transmit uplink (UL) data via the final path.

28. The MS of claim 27, wherein the fourth training signal is transmitted before the reception of the UL data.

* * * * *